United States Patent
Yang et al.

(10) Patent No.: US 11,820,287 B2
(45) Date of Patent: Nov. 21, 2023

(54) VEHICLE INTERIOR COMPONENT

(71) Applicant: Shanghai Yanfeng Jinqiao Automotive Trim Systems Co. Ltd., Novi, MI (US)

(72) Inventors: He Yang, Shanghai (CN); Jing Gu, Shanghai (CN); Yang Bai, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 134 days.

(21) Appl. No.: 17/495,168

(22) Filed: Oct. 6, 2021

(65) Prior Publication Data

US 2022/0024378 A1    Jan. 27, 2022

Related U.S. Application Data

(63) Continuation of application No. PCT/CN2020/084159, filed on Apr. 10, 2020.

(30) Foreign Application Priority Data

Apr. 11, 2019 (CN) .......................... 201920481470.2

(51) Int. Cl.
*B60Q 3/54* (2017.01)
*B32B 7/023* (2019.01)
*B32B 5/02* (2006.01)

(52) U.S. Cl.
CPC .............. *B60Q 3/54* (2017.02); *B32B 5/022* (2013.01); *B32B 5/024* (2013.01); *B32B 7/023* (2019.01);
(Continued)

(58) Field of Classification Search
CPC ... B60Q 3/54; B60Q 3/10; B60Q 3/14; B60Q 3/20; B60Q 3/217; B60Q 3/233;
(Continued)

(56) References Cited

U.S. PATENT DOCUMENTS

| 8,303,147 B2 | 11/2012 | Jeon |
| 8,449,161 B2 * | 5/2013 | Igoe ...................... B60Q 3/745 |
| | | 362/558 |

(Continued)

FOREIGN PATENT DOCUMENTS

| CN | 1782220 A | 6/2006 |
| CN | 2871308 Y | 2/2007 |

(Continued)

OTHER PUBLICATIONS

Extended European Search Report received for European Patent Application Serial No. 20787819.0 dated Dec. 16, 2022, 8 pages.

(Continued)

*Primary Examiner* — Laura K Tso

(74) *Attorney, Agent, or Firm* — Amin, Turocy & Watson, LLP

(57) ABSTRACT

A vehicle interior component configured to provide an illuminated display/image and comprising a composite structure is disclosed. The component may comprise a cover providing a surface for the illuminated display/image and a substrate; the cover may comprise a cover layer, bottom layer and/or intermediate layer. The cover layer may comprise a surface layer and a base layer. The base layer and/or bottom layer may comprise a reinforcing layer. The surface layer, cover layer and/or base layer may comprise a pigment. The surface layer, cover layer and/or bottom layer may comprise a colorant (or pigment, dye, etc.). The bottom layer may comprise a pattern region comprising the image, a mask and/or light-blocking layer. The composite structure may comprise the cover, a functional layer, spacer/buffer layer, diffuser layer, sensor grid, capacitive sensor, textile and/or base/substrate. The cover surface may comprise a skin.

19 Claims, 14 Drawing Sheets

(52) U.S. Cl.
CPC ... *B32B 2307/4026* (2013.01); *B32B 2307/41* (2013.01); *B32B 2307/412* (2013.01); *B32B 2457/20* (2013.01)

(58) Field of Classification Search
CPC ......... B32B 7/023; B32B 5/022; B32B 5/024; B32B 2307/4026; B32B 2307/41; B32B 2307/412; B32B 2457/20
USPC .......................................................... 362/488
See application file for complete search history.

(56) References Cited

U.S. PATENT DOCUMENTS

| | | | |
|---|---|---|---|
| 8,585,941 | B2 | 11/2013 | Feng et al. |
| 9,604,569 | B1 | 3/2017 | Salter et al. |
| 2008/0158510 | A1 | 7/2008 | Tant et al. |
| 2009/0080208 | A1 | 3/2009 | Droste et al. |
| 2016/0325674 | A1 | 11/2016 | Krull et al. |
| 2019/0135199 | A1* | 5/2019 | Galan Garcia ........ B60K 35/00 |

FOREIGN PATENT DOCUMENTS

| | | |
|---|---|---|
| CN | 202966147 U | 6/2013 |
| CN | 102198749 A | 10/2014 |
| CN | 102198749 B | 10/2014 |
| CN | 107176113 A | 9/2017 |
| CN | 207274074 U | 4/2018 |
| CN | 109398258 A | 3/2019 |
| CN | 109476261 A | 3/2019 |
| CN | 210116215 U | 2/2020 |
| DE | 103 09 225 A1 | 9/2004 |
| DE | 20 2017 104 984 U1 | 8/2018 |
| EP | 2 060 443 B1 | 8/2016 |
| EP | 3 184 348 A2 | 6/2017 |
| TW | I365810 B | 6/2012 |
| WO | 2018/013557 A1 | 1/2018 |
| WO | 2019/113690 A1 | 6/2019 |

OTHER PUBLICATIONS

International Search Report and Written Opinion received for PCT Application Serial No. PCT/CN2020/084159 dated Jun. 2, 2020, 4 pages.

* cited by examiner

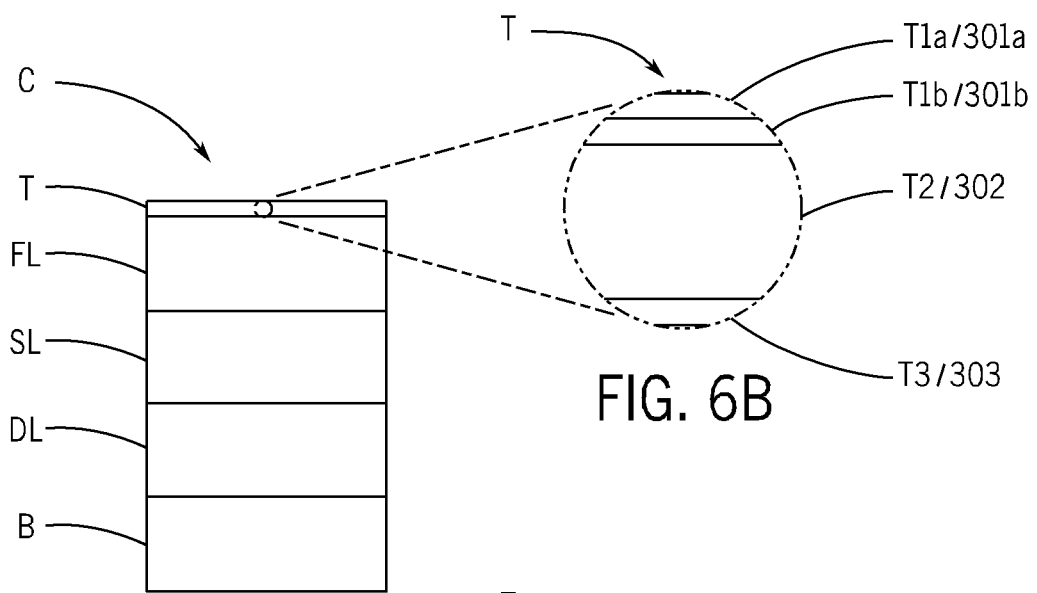
FIG. 6A
FIG. 6B
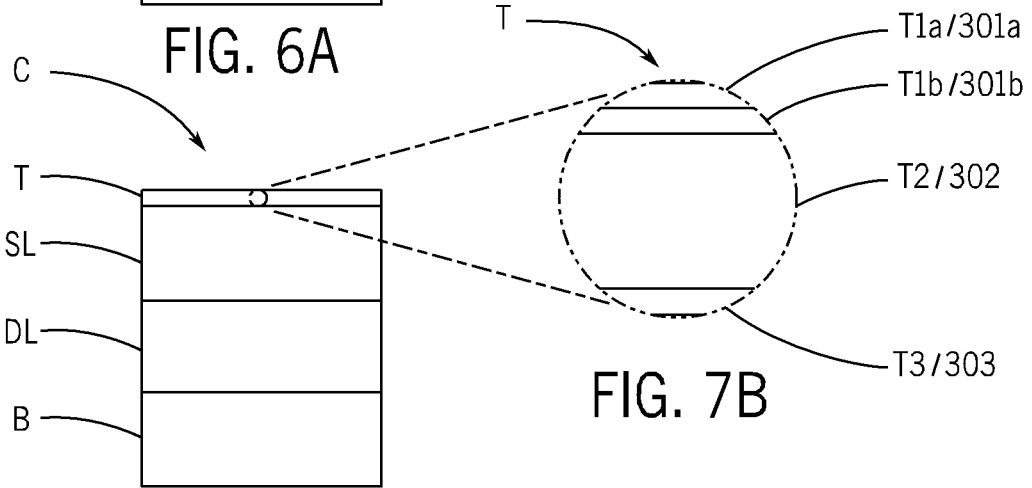
FIG. 7A
FIG. 7B
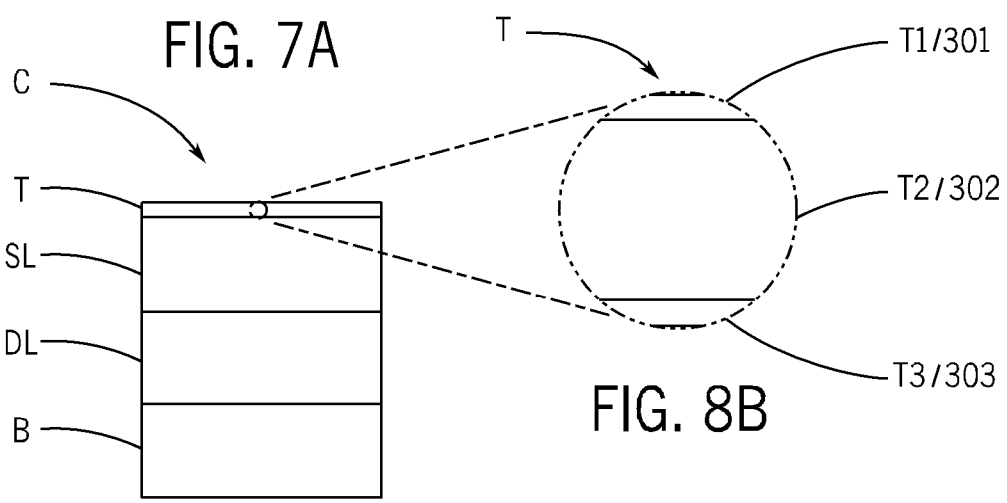
FIG. 8A
FIG. 8B

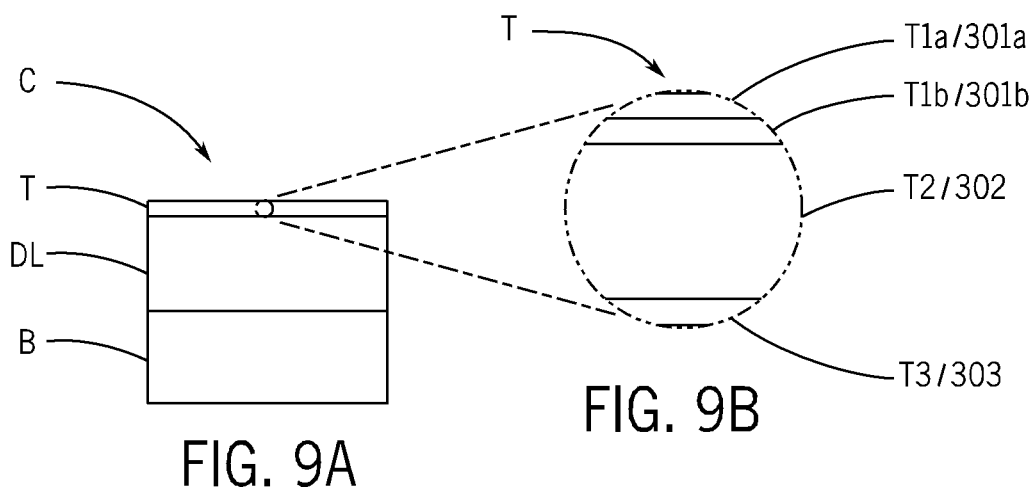
FIG. 9A
FIG. 9B
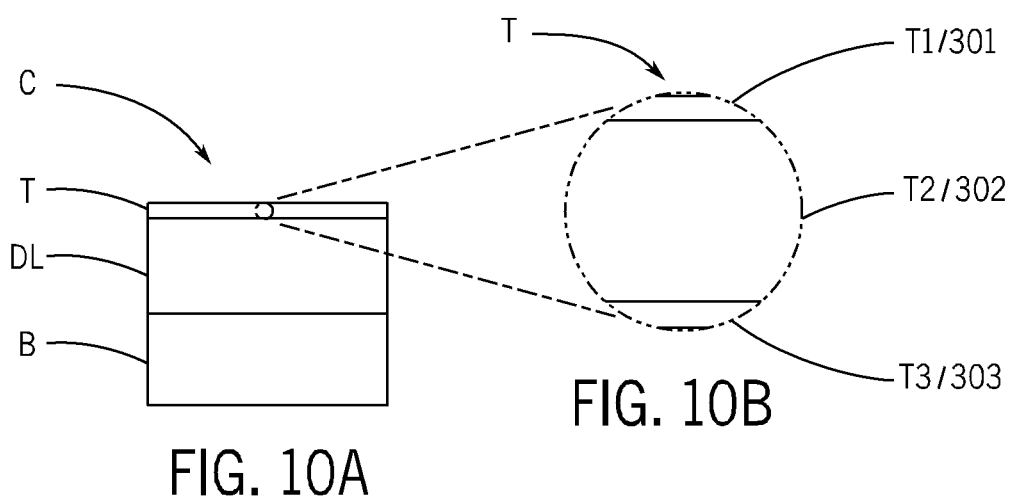
FIG. 10A
FIG. 10B

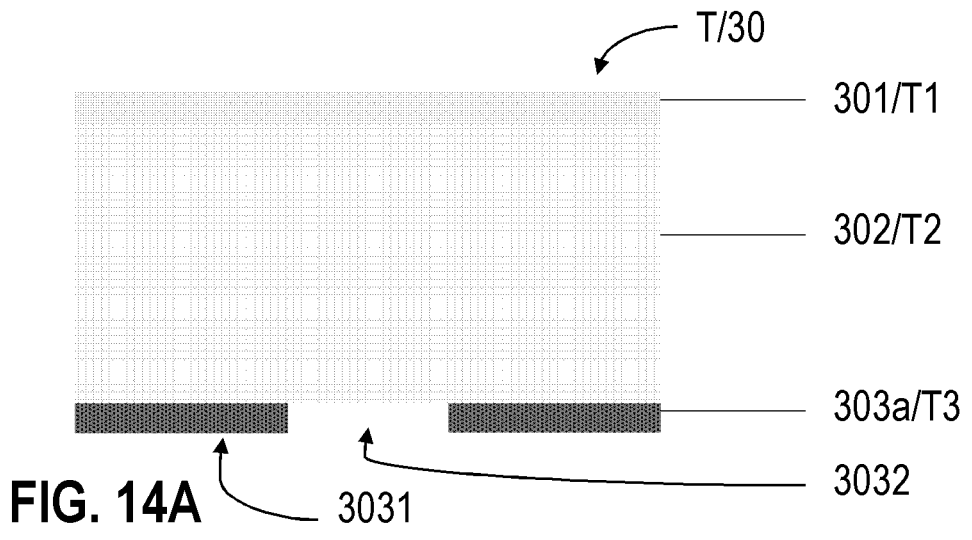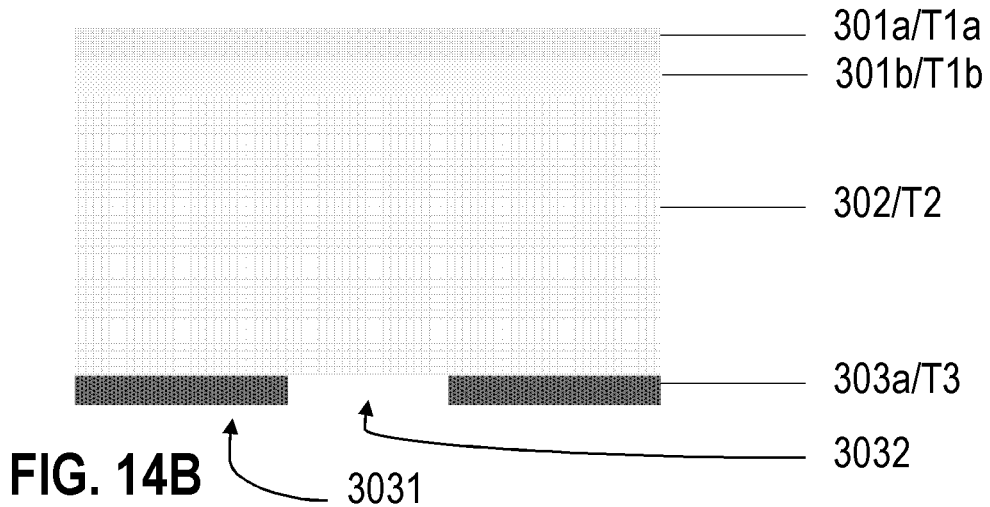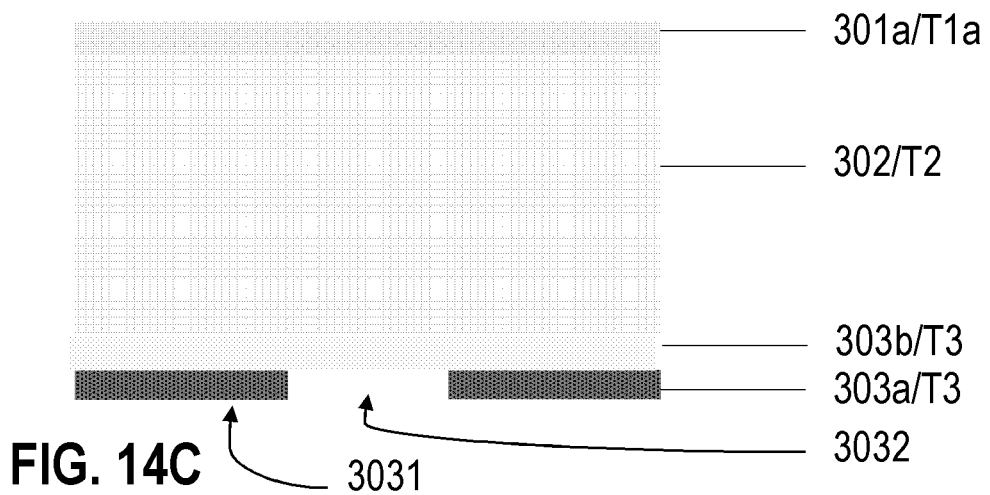

VEHICLE INTERIOR COMPONENT

CROSS-REFERENCE TO RELATED APPLICATIONS

The present application is a continuation of PCT/International Patent Application No. PCT/CN2020/084159 titled "VEHICLE INTERIOR COMPONENT" filed Apr. 10, 2020, which claims the benefit of Chinese Patent Application No. 201920481470.2 filed Apr. 11, 2019 (now Chinese Utility Model No. CN210116215U).

The present application claims priority to and incorporates by reference in full the following patent applications: (a) Chinese Patent Application No. 201920481470.2 filed Apr. 11, 2019 (now Chinese Utility Model No. CN210116215U); (b) PCT/International Patent Application No. PCT/CN2020/084159 titled "VEHICLE INTERIOR COMPONENT" filed Apr. 10, 2020.

FIELD

The present invention relates to vehicle interior component.

The present invention also relates to vehicle interior component comprising a composite structure configured to provide a cover surface for a display.

BACKGROUND

It is known to provide a vehicle interior component configured to provide a cover surface.

It would be advantageous to provide an improved vehicle interior component comprising a composite structure configured to provide a cover surface for display such as an image.

SUMMARY

The present invention relates to a vehicle interior component configured to provide a display of an image from illumination by a light source comprising a composite structure comprising a substrate and cover. The cover may comprise a bottom layer and an intermediate layer and a cover layer providing a cover surface. The intermediate layer may comprise a light-transmissive sheet. The cover layer may comprise a light-transmissive skin. The composite structure may be configured so that the display of the image is presented at the cover surface. Illumination from the light source through the composite structure may display the image at the cover surface. The bottom layer of the cover may comprise a sheet and the cover layer of the cover may comprise a sheet. The intermediate layer of the cover may comprise a reinforcing layer for the cover. The light-transmissive sheet of the intermediate layer of the cover may comprise a colorless base material. The cover layer of the cover may comprise a surface layer providing the cover surface and a base layer. The base layer of the cover layer may comprise a reinforcing layer for the surface layer. The base layer of the cover layer may comprise a colorant. The cover layer of the cover may comprise a colorant. The bottom layer of the cover may comprise a colorant. The bottom layer of the cover may comprise a light-blocking layer. The bottom layer of the cover may comprise a peripheral region and a pattern region; the pattern region may comprise the image to be presented by illumination. The bottom layer of the cover may comprise a mask configured to provide a pattern comprising the image to be presented by illumination. The composite structure may comprise a functional layer; the functional layer may comprise at least one of a spacer layer; a diffuser layer; a sensor grid; a capacitive sensor; a textile; a textile configured to provide reinforcement for the skin; a material configured to impart resilience and a soft feeling when touched. The composite structure may comprise a spacer layer; the spacer layer may comprise at least one of (a) a spacer; (b) a fabric; (c) a mesh fabric; (d) a non-woven sheet; (e) a woven sheet; (f) a foam layer; (g) a separator; (h) a material having light transmissibility; (i) a polyester material; (j) a mono-filament material; (k) a multi-filament material; (l) a buffer layer; (m) a diffuser. The composite structure may comprise a diffuser layer; the diffuser layer may comprise at least one of a diffuser sheet; a lens; a material with light transmissibility. The composite structure may comprise the cover and a spacer layer and a functional layer and a base; the base may comprise the substrate. Light transmissibility of the cover may be in a range of between approximately 3 percent and approximately 10 percent. The light source may comprise at least one of an LED array; an LED; an LED and a light guide; a sidelight and a light guide.

The present invention relates to a component for a vehicle interior comprising a substrate and a cover on the substrate comprising a light-transmissive skin. The light-transmissive skin may comprise a first color layer at least having a top layer and a second color layer at least having a bottom layer. The bottom layer of the second color layer may comprise at least one pattern region and a peripheral region surrounding the pattern region. The pattern region may be light-transmissive and the peripheral region surrounding the pattern region may be light blocking. The cover may comprise an intermediate/middle layer located between the first color layer and the second color layer. The first color layer may comprise at least one reinforcing layer located between the top layer and the intermediate/middle layer and/or the second color layer may comprise at least one reinforcing layer between the bottom layer and the intermediate/middle layer. The thickness of the intermediate/middle layer may be greater than or equal to the thickness of the bottom layer of the second color layer. The first color layer may comprise a plastic material; the second color layer may comprise a plastic material; the plastic material of the first color layer may comprise at least one of (a) polyurethanes and/or (b) polyvinyl chlorides and/or (c) polystyrenes and/or (d) polyolefins and/or (e) a polyester elastomer and/or (f) polyamides and silicone; the intermediate/middle layer may comprise a plastic material comprising at least one of (a) polyurethanes and/or (b) polyvinyl chlorides and/or (c) polystyrenes and/or (d) polyolefins and/or (e) a polyester elastomer and/or (f) polyamides and/or (g) silicone and/or (h) a woven fabric and/or (i) a three-dimensional fabric made of natural fibers and/or (j) chemical fibers. The pattern region of the second color layer may be created by finishing and/or drilling and/or sanding and/or laser engraving and/or chemical etching and/or ion/electron beam thinning and/or finishing. The component may comprise a composite structure comprising the substrate and the light-transmissive skin; the light-transmissive skin may comprise a soft thin plastic sheet. The base layer of the cover may comprise a colorant. The thickness of the intermediate/middle layer may be greater than or equal to the thickness of the bottom layer of the second color layer. The component may comprise a composite structure comprising the substrate and the cover.

The present invention relates to a vehicle interior component configured to provide a display such as of an image from illumination by a light source comprising a composite structure comprising a cover providing a cover surface and a substrate; the cover may comprise a cover layer and a bottom layer; the composite structure may be configured so that the display of the image is presented on the cover surface; so that illumination from the light source will provide display of the image at the cover surface. The cover surface may comprise a skin. The cover may comprise an intermediate layer. The intermediate layer may comprise a light-transmissive layer. The cover layer may comprise a surface layer. The cover layer may comprise a surface layer and a base layer. The base layer may comprise a reinforcing layer. The bottom layer may comprise a reinforcing layer. The surface layer may comprise a pigment. The cover layer may comprise a pigment. The base layer may comprise a pigment. The surface layer may comprise a colorant. The cover layer may comprise a colorant (or pigment, dye, etc.). The bottom layer may comprise a reinforcing layer. The bottom layer may comprise a light-blocking layer. The bottom layer may comprise a colorant. The bottom layer may comprise a peripheral region and a pattern region. The pattern region may comprise the image. The bottom layer may comprise a mask. The bottom layer may comprise a mask configured to provide a pattern. The pattern may comprise the image. The composite structure may comprise a functional layer. The functional layer may comprise a sensor grid. The functional layer may comprise a capacitive sensor. The functional layer may comprise a textile. The cover surface may comprise a skin. The textile may comprise reinforcement for the skin. The composite structure may comprise a spacer layer. The spacer layer may comprise a buffer layer. The spacer layer may comprise a space. The spacer layer may comprise a fabric. The spacer layer may comprise at least one of (a) a fabric; (b) a mesh fabric; (c) a non-woven sheet; (d) a woven sheet; (e) a foam layer; (f) a separator; (g) a material having light transmissibility; (h) a polyester material; (i) a mono-filament material; (j) a multi-filament material. Light transmissibility for the material of the spacer layer may be in a range of between approximately 30 percent and approximately 90 percent. The component further comprising a module. The module may comprise a housing. The module may comprise the composite structure. The module may comprise the light source. The module may comprise a housing. The composite structure may comprise a diffuser layer. The diffuser layer may comprise a diffuser sheet. The diffuser layer may comprise a lens. The diffuser layer may comprise a material with light transmissibility. Light transmissibility may be in a range of between approximately 40 percent and approximately 90 percent. The composite structure may comprise the cover and a functional layer and the substrate. The composite structure may comprise the cover and a spacer layer and a functional layer and a base; the base may comprise the substrate. The composite structure may comprise the cover and a functional layer and the base. The composite structure may comprise the cover and a functional layer and the base. The composite structure may comprise the cover and a functional layer and the base. The composite structure may comprise the cover and a diffuser layer and the base. The substrate may comprise a base. Light transmissibility of the substrate may be in a range of between approximately 80 percent and approximately 95 percent. Light transmissibility of the cover may be in a range of between approximately 3 percent and approximately 10 percent. The component may comprise the light source. The light source may comprise an LED array. The light source may comprise an LED. The light source may comprise an LED and a light guide. The LED may comprise a sidelight for the light guide. Without illumination from the light source the image is not visible at the cover surface.

The present invention relates to a light-transmitting skin characterized in that the light-transmitting skin comprises a first colored layer at least having a top layer, and a second colored layer at least having a bottom layer, the bottom layer of the second colored layer may comprise at least one pattern region and a peripheral region surrounding the pattern region; and the peripheral region surrounding the pattern region may be lightproof (light blocking). The light-transmitting skin may comprise a middle layer located between the first colored layer and the second colored layer. The first colored layer may comprise at least one reinforcing layer located between the top layer and the middle layer, and/or, the second colored layer may comprise at least one reinforcing layer located between the bottom layer and the middle layer. For each layer in a same thickness, the light transmittance of the middle layer and the reinforcing layer may be greater than or equal to the light transmittance of the top layer of the first colored layer, and the light transmittance of the top layer of the first colored layer may be greater than the light transmittance of the peripheral region of the bottom layer of the second colored layer. The thickness of the middle layer may be greater than or equal to the thickness of the bottom layer of the second colored layer. The thickness of the middle layer may be twice or more than twice the thickness of the bottom layer of the second colored layer. The first colored layer and the second colored layer are plastic materials, and at least comprise one of polyurethanes, polyvinyl chlorides, polystyrenes, polyolefins, a polyester elastomer, polyamides and silicones; the middle layer may be a plastic material, and may comprise one of polyurethanes, polyvinyl chlorides, polystyrenes, polyolefins, a polyester elastomer, polyamides and silicones, or the middle layer may be a woven fabric or a three-dimensional fabric made of natural fibers and/or chemical fibers. When the middle layer is the plastic material, lining cloth may be further provided on the back surface of the second colored layer, and the lining cloth may be a woven fabric or a three-dimensional fabric. The thickness of the pattern region may be less than the thickness of the peripheral region. The pattern region of the second colored layer may be treated by drilling, sanding, laser engraving, chemical etching and ion/electron beam thinning. The light-transmitting trim may comprise the light-transmitting skin, a substrate, and a light source.

FIGURES

FIG. 6A is a schematic partial section view of a vehicle interior component according to an exemplary embodiment.

FIG. 6B is a schematic partial cutaway section view of a vehicle interior component according to an exemplary embodiment.

FIG. 7A is a schematic partial section view of a vehicle interior component according to an exemplary embodiment.

FIG. 7B is a schematic partial cutaway section view of a vehicle interior component according to an exemplary embodiment.

FIG. 8A is a schematic partial section view of a vehicle interior component according to an exemplary embodiment.

FIG. 8B is a schematic partial cutaway section view of a vehicle interior component according to an exemplary embodiment.

FIG. 9A is a schematic partial section view of a vehicle interior component according to an exemplary embodiment.

FIG. 9B is a schematic partial cutaway section view of a vehicle interior component according to an exemplary embodiment.

FIG. 10A is a schematic partial section view of a vehicle interior component according to an exemplary embodiment.

FIG. 10B is a schematic partial cutaway section view of a vehicle interior component according to an exemplary embodiment.

FIGS. 14A through 14C are schematic partial section views of a vehicle interior component according to an exemplary embodiment.

DESCRIPTION

Figure 1A:
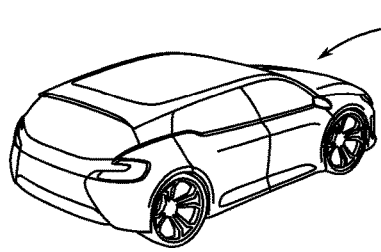
FIG. 1A is a schematic perspective view of a vehicle according to an exemplary embodiment.
Figure 1B:
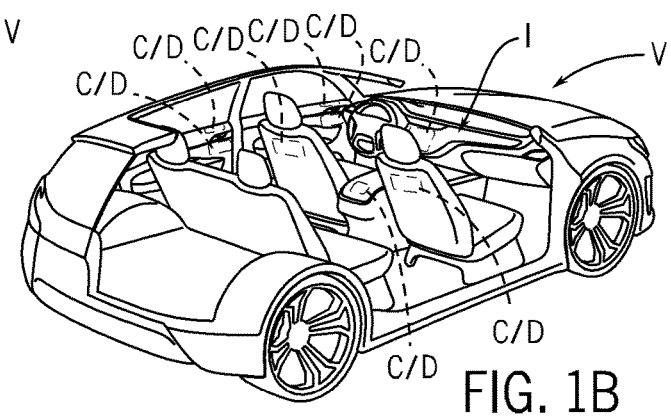
FIG. 1B is a schematic partial perspective view of a vehicle interior according to an exemplary embodiment.
Figure 2:
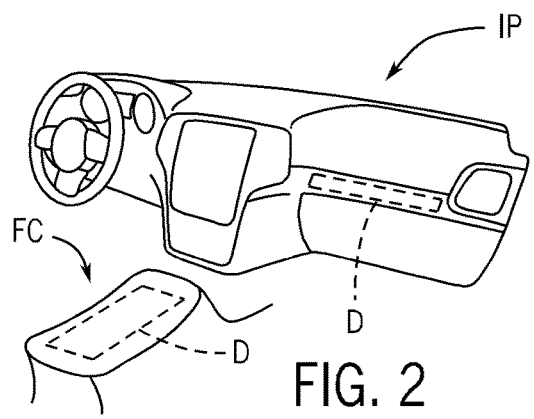
FIG. 2 is a schematic partial perspective view of a vehicle interior according to an exemplary embodiment.
Figure 3A:
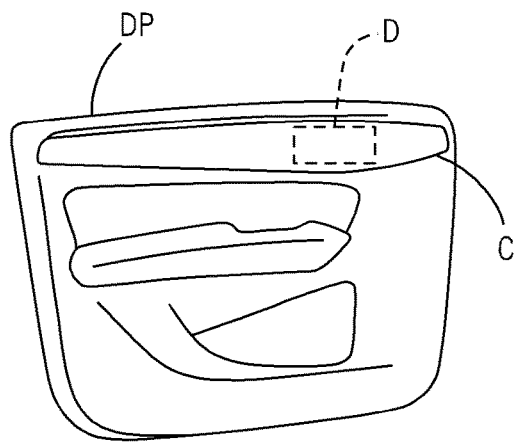
FIG. 3A is a schematic perspective view of a vehicle interior component shown as a door panel according to an exemplary embodiment.
Figure 3B:
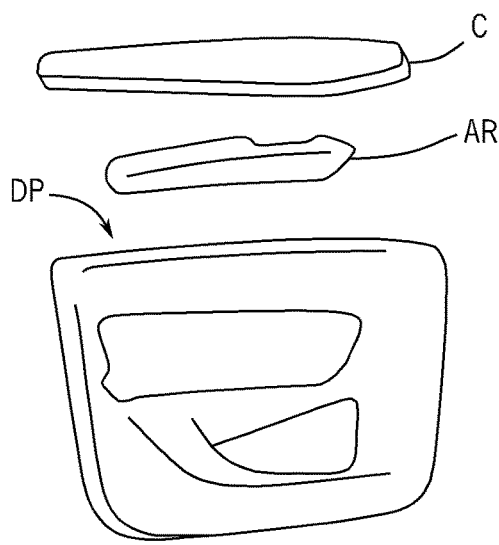
FIG. 3B is a schematic exploded view of a vehicle interior component according to an exemplary embodiment.
Figure 3C:
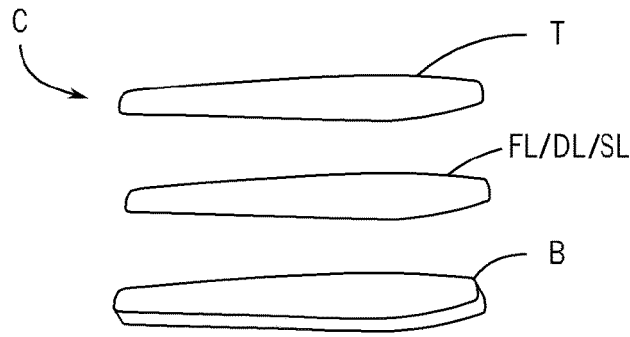
FIG. 3C is a schematic exploded view of a decorative panel of a vehicle interior component according to an exemplary embodiment.
Figure 4A:
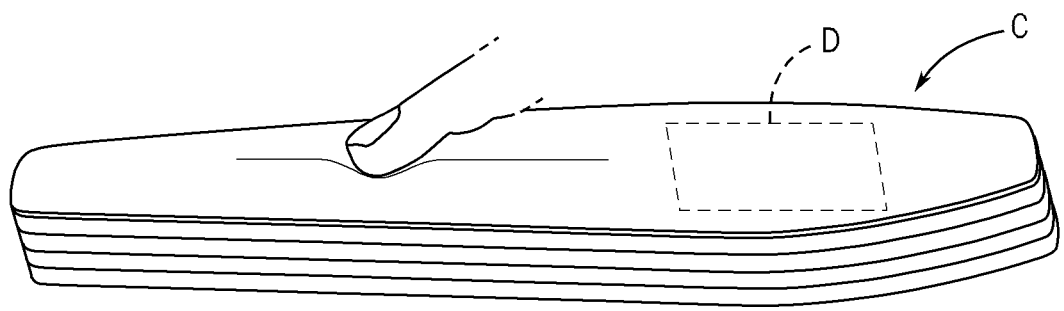
FIGS. 4A and 4B are schematic perspective views of a vehicle interior component according to an exemplary embodiment.
Figure 4B:

Referring to FIGS. 1A and 1B, a vehicle V is shown comprising an interior I with components C configured to provide a display D. As shown schematically in FIGS. 1B, 2 and 3A-3C, the interior I may comprise components such as a floor console FC, instrument panel IP and door panel DP (with armrest AR). As indicated schematically in FIG. 3C, the component C comprising the display D comprise a base B and a cover T and an intermediate section shown as comprising a functional layer FL and/or a diffuser layer DL and/or a spacer layer SL. See also FIGS. 6A-6B, 7A-7B, 8A-8B, 9A-9B, 10A-10B, 13, 14A-14C, 15, 16, 17 and 18.

Figure 5A:
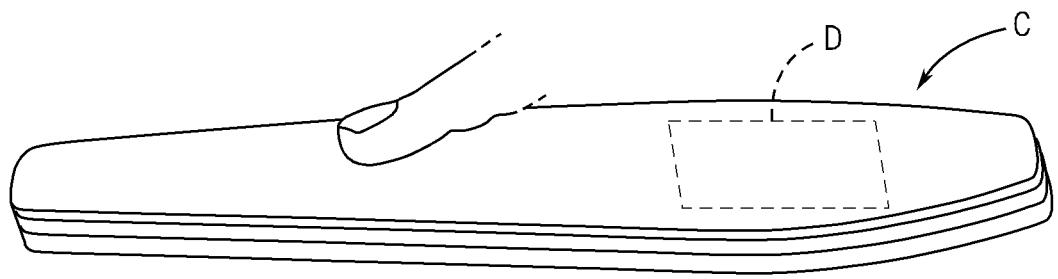
FIG. 5A and 5B are schematic perspective views of a vehicle interior component according to an exemplary embodiment.
Figure 5B:
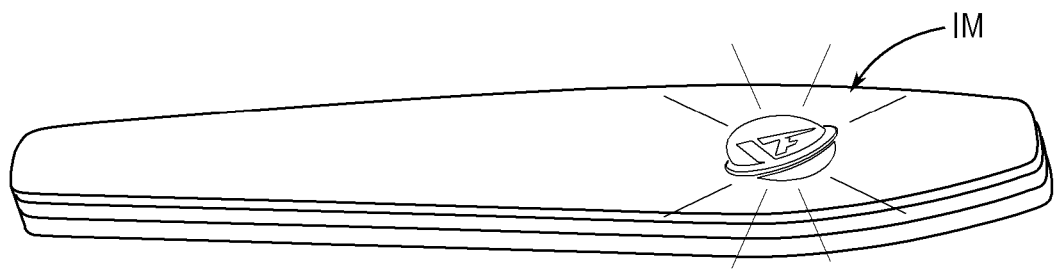

As indicated schematically in FIGS. 4A-4B and 5A-5B, the component C may comprise a composite structure configured to provide a compliant (e.g. resilient, soft, etc.) surface (see FIG. 4A) and/or configured to provide a generally firm surface (see FIG. 5A). As indicated schematically in FIGS. 4A-4B and 5A-5B, the composite structure of the component C may be configured to provide a display area D configured for display of an image IM (e.g. an illuminated image) by illumination from a light source through the composite structure to the surface of cover T. See also FIGS. 16 and 17. As indicated schematically in FIG. 18, the composite structure of component C may comprise a cover T and base B with a functional layer FL and/or a spacer layer SL and/or an diffuser layer DL; the cover T may comprise a surface layer Ta with reinforcing layer Tb and an intermediate layer TL with a base layer BL. See also FIGS. 19 and 20A-20D (manufacturing process for cover/composite structure).

As indicated schematically in FIGS. 6A-6B, 7A-7B, 8A-8B, 9A-9B and 10A-10B, the composite structure of the component C may comprise a multi-layer construction comprising a cover T and a base B. See also TABLE A. As indicated schematically in FIGS. 6A-6B, the composite structure may comprise the cover T and base B with a functional layer FL and a spacer layer SL and a diffuser layer DL; the cover T may comprise a cover layer T1 and a base layer T3 with an intermediate layer T2; the cover layer may comprise a surface layer T1$a$ and a base layer T1$b$. See also TABLE A and FIGS. 16 and 17.

As indicated schematically in FIGS. 7A-7B, the composite structure may comprise the cover T and base B with a spacer layer SL and a diffuser layer DL; the cover T may comprise a cover layer T1 and a base layer T3 with an intermediate layer T2; the cover layer may comprise a surface layer T1$a$ and a base layer T1$b$. See also TABLE A and FIGS. 16 and 17.

As indicated schematically in FIGS. 8A-8B, the composite structure may comprise the cover T and base B with a spacer layer SL and a diffuser layer DL; the cover T may comprise a cover layer T1 and a base layer T3 with an intermediate layer T2. See also TABLE A and FIGS. 16 and 17.

As indicated schematically in FIGS. 9A-9B, the composite structure may comprise the cover T and base B with a diffuser layer DL; the cover T may comprise a cover layer T1 and a base layer T3 with an intermediate layer T2; the cover layer may comprise a surface layer T1$a$ and a base layer T1$b$. See also TABLE A and FIGS. 16 and 17.

As indicated schematically in FIGS. 10A-10B, the composite structure may comprise the cover T and base B with a functional layer FL and a spacer layer SL and a diffuser layer DL; the cover T may comprise a cover layer T1 and a base layer T3 with an intermediate layer T2. See also TABLE A and FIGS. 16 and 17.

Figure 11A:
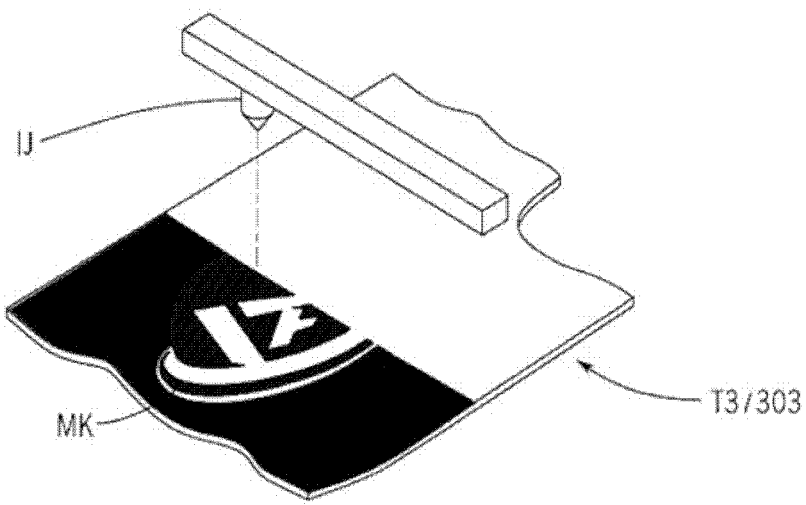
FIGS. 11A through 11C are schematic diagrams of a method for forming a vehicle interior component according to an exemplary embodiment.
Figure 11B:
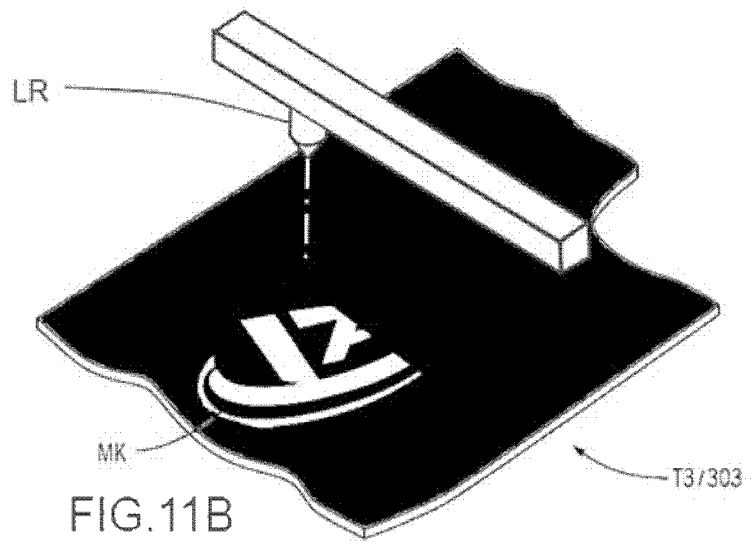
Figure 11C:
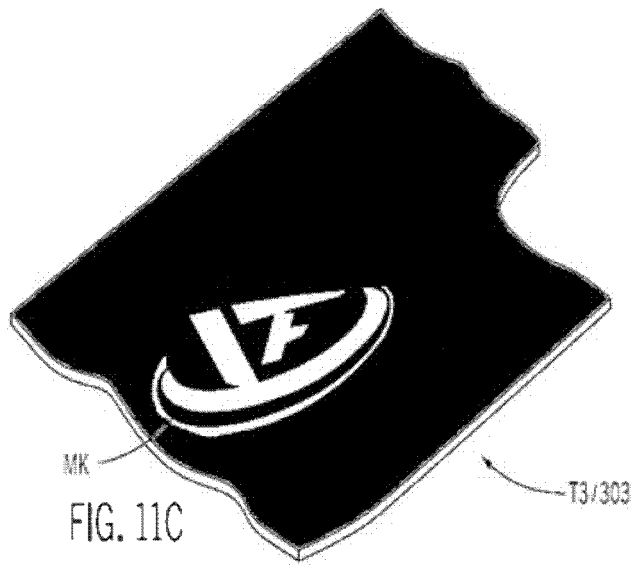
Figure 12:
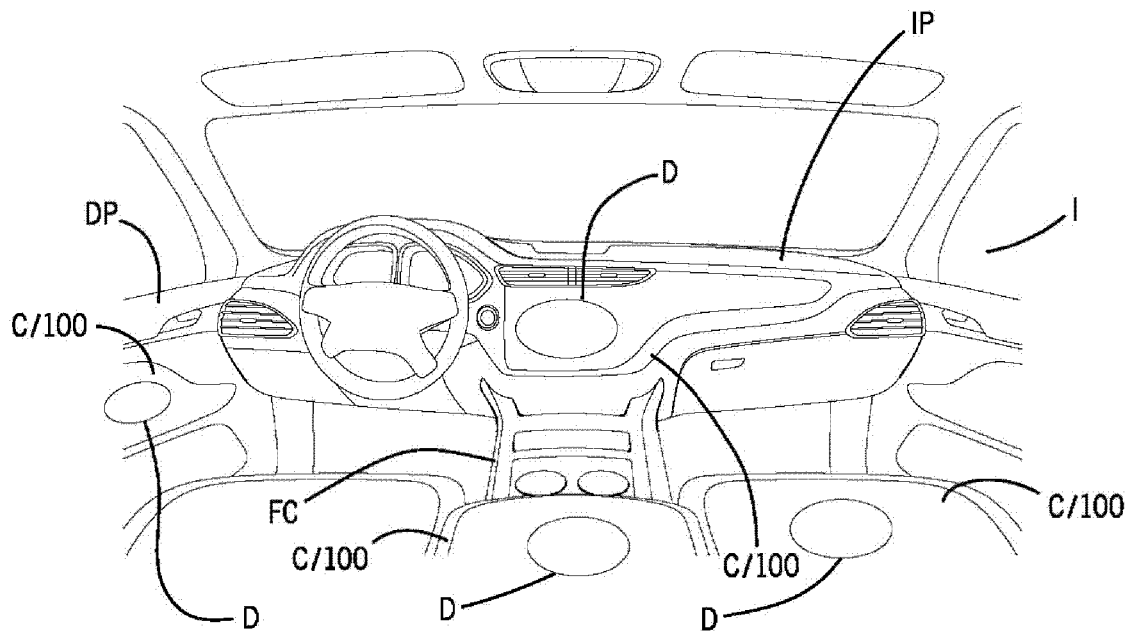
FIG. 12 is a schematic partial perspective view of a vehicle interior according to an exemplary embodiment.
Figure 13:
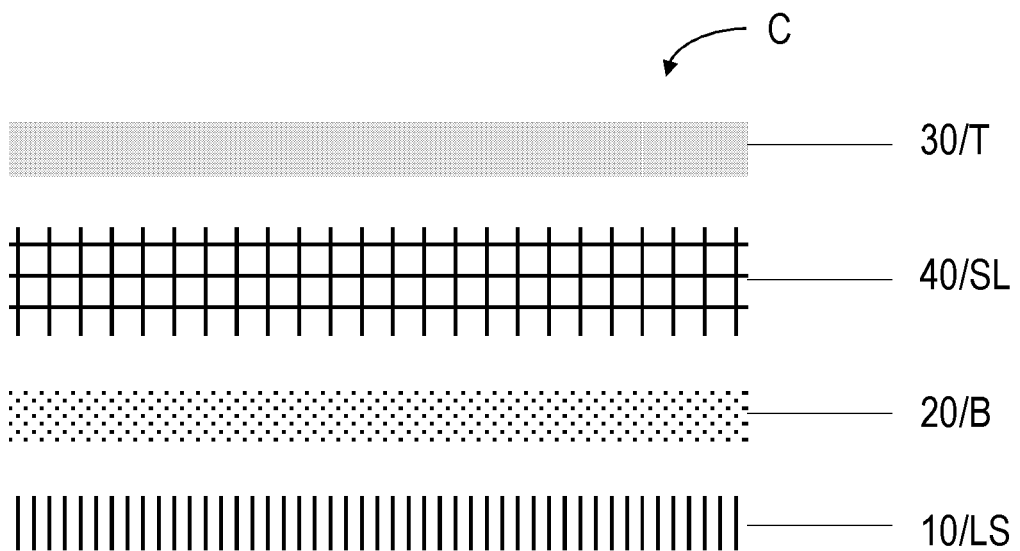
FIG. 13 is a schematic partial exploded section view of a vehicle interior component according to an exemplary embodiment.

As indicated schematically in FIGS. 11A-11C, the base layer T3 of the cover may comprise a mask/pattern MK; the mask MK may be applied in a pattern/image by deposition (e.g. ink jet, coating, etc.) from an apparatus such as an coating spray/ink jet printer IJ (see FIG. 11A); the mask MK may be created with a pattern/image by etching/ablation of a mask material by an apparatus such as laser LR (see FIG. 11B).

As indicated schematically according to an exemplary embodiment in FIGS. 3A-3C, 4A-4B, 5A-5B, 6A-6B, 7A-7B, 8A-8B, 9A-9B, 10A-10B, 13, 14A-14C, 15, 16, 17 and 18, the component C may be configured to provide a display D such as of an image from illumination by a light source LS; illumination from the light source will provide display of the image IM at the cover surface.

TABLE A

| # | Item/Element | Function | Material/Properties (example) | Manufacture Size/Thickness (example range) |
|---|---|---|---|---|
| M | Module (housing) | subassembly of component | plastic/resin, etc. | conventional manufacture, injection molding, assembly, etc. |
| LS1060 | Light source (LED array) | transmit light | LED Example brightness 700-800 cd/m^2 | |
| B20 | substrate/base (base layer of composite structure) | light transmissive (transparent/translucent) (85-95%) | transparent polymers (PC/polycarbonate; PMMA (high translucence), SAN, PA) | 2-3 mm (injection molded) |
| 40SL | buffer layer spacer layer textile layer | spacing/separation, softness (spacer, mesh, fabric, non-woven fabric, foam, etc.) light transmission (30-90% range) (if thicker the less light is transmitted) | PES (polyester) (mesh and fabric, and non-woven fabric); PU in case of foam (may be PE); vertical wires may be monofilaments instead of multi-filaments (will block more light compared with monofilaments) | 1.6-4.2 mm (preferable 2.2-3.0 mm) (foam, knit, woven, non-woven, etc.) |
| FL | functional layer textile layer (optional) | Enables decorative (functional) stitched seams; prevents skin to tear at perforation (stitches) | PES some light transmission possible (other textile material transmit light through gaps/holes) | 0.5-0.7 mm textile (knit, weave, etc.) |
| FL | functional layer sensor grid | sensor for touch, etc. (e.g. capacitive grid, etc.) | | |
| DL | diffuser layer (optional) | lens with diffusing power (light transmission 40-90%) | PC | 0.1-0.2 mm sheet material |
| T30 | cover/skin (composite layer/structure) | light transmission (3-10%) | PU, TPO, PVC, etc. | multi-layer composite structure |
| 301 | cover layer/composite layer | light-transmissive material colored/pigmented layer (comprises light-transmissive material) | | 0.02-0.06 mm coat layer by layer (co-extrusion with middle layer possible) |
| 301a | top layer cover layer surface layer | Translucent/light-transmissive (when display "on") (opaque when "off") | PU, PVC and/or pigments | 0.02-0.03 mm coat (e.g. screen print, spray, roll, etc.) |
| 301b | reinforcing layer base layer (optional) | reinforces color/pigment (light-transmissive) | PU, PVC and/or pigments | 0.02-0.03 mm coat or screen print |
| TL302 | middle/intermediate layer | Manufacturability (structure) translucent/skin (light-transmissive) | PU, PVC, TPO can contain small amount of pigments | 0.3-0.4 mm coat layer by layer (in case of TPO die cast film extrusion, calendering of PVC) |
| BL303 | bottom layer/composite layer | colored/pigmented layer (light-transmissive) | PU or Acrylic and/or pigments | 0.02-0.03 mm coat (e.g. screen print, spray, roll, etc.) |
| 303a | bottom layer | Opaque (light blocking) (light-transmissive segments/sections) | PU or Acrylic and/or pigments | 0.02-0.03 mm coat (e.g. screen print, spray, roll, etc.) |
| 303b | reinforcing layer base layer (optional) | reinforces color/pigment (light transmissive) | PU or Acrylic and/or pigments | 0.02-0.03 mm coat (e.g. screen print, spray, roll, etc.) |
| MK | mask layer | light blocking/masking | ink, applied sheet, etc. | |
| 3031 | peripheral region | light blocking (pattern/segments) | PU or Acrylic and/or pigments | 0.02-0.03 mm coat (e.g. screen print, spray, roll, etc.) |

TABLE A-continued

ELEMENT/MATERIAL (PROPERTIES/FUNCTION)

| # | Item/Element | Function | Material/ Properties (example) | Manufacture Size/Thickness (example range) |
|---|---|---|---|---|
| 3032 | pattern region | light transmission (pattern) (light-transmissive) | | |

Exemplary Embodiments—A

As shown schematically according to an exemplary embodiment in FIGS. 12, 13, 14A-14C and 15, a vehicle interior component may provide a light-transmitting skin and a light-transmitting trim with the light-transmitting skin to provide a decorative effect. See also FIGS. 4A-4B, 5A-5B, 16 and 17.

According to an exemplary embodiment, a light-transmitting skin may comprise a first colored layer comprising at least a top layer, and a second colored layer comprising at least a bottom layer; the bottom layer of the second colored layer may comprise at least one pattern region and a peripheral region surrounding the pattern region; the peripheral region surrounding the pattern region may be lightproof. See FIGS. 6A-6B, 7A-7B, 8A-8B, 9A-9B, 10A-10B, 13, 14A-14C, 15, 16, 17 and 18.

According to an exemplary embodiment, a light-transmitting skin may comprise a first colored layer for providing an appearance surface of the light-transmitting skin, a second colored layer for providing an illuminable pattern which can be seen on the appearance surface of the light-transmitting skin, and a middle layer located between the first colored layer and the second colored layer; the second colored layer may comprise a pattern region corresponding to the illuminated pattern, and a thickness of the pattern region may be less than a thickness of the peripheral region. See FIGS. 6A-6B, 7A-7B, 8A-8B, 9A-9B, 10A-10B, 13, 14A-14C, 15, 16, 17 and 18.

According to an exemplary embodiment as indicated schematically in FIGS. 6A-6B, 7A-7B, 8A-8B, 9A-9B, 10A-10B, 13, 14A-14C, 15, 16, 17 and 18, the skin may comprise a soft thin plastic product that covers an outer surface of a part, may be directly touched by a driver or a passenger and may comprise specific colors and grain on the front surface, i.e., a fabric with a plastic material; the thickness of the skin may be generally 0.1 to 5 mm, and preferably, 0.2 to 2 mm; the pattern may be an image, a character and a mark, i.e., any display form designed by a designer; the first colored layer and second colored layer may each comprise one or more layers; to provide color and pattern of the light-transmitting skin, the first colored layer may comprise a top layer with a pigment and/or dye; to provide wear resistance and tensile strength of the light-transmitting skin, the first colored layer may comprise at least one reinforcing layer located below the top layer; the second colored layer may comprise a bottom layer with a pigment and/or dye; to provide desire feel when touched and mechanical properties such as tensile strength of the light-transmitting skin, the second colored layer may comprise at least one reinforcing layer located between the bottom layer and the middle layer; the bottom layer of the second colored layer may comprise a pattern region; the contour of the pattern region may correspond to the contour of the pattern displayed on a visible surface when the light-transmitting skin is illuminated; the thickness of the pattern region may be non-uniform, a thickness of the pattern region may be less than a thickness of the peripheral region of the bottom layer; the thickness of the pattern region may approximate to zero; the thickness of the pattern area may be typically between 0.02 mm and 0.03 mm; the top layer of the first colored layer and the bottom layer of the second colored layer may comprise pigments and/or dyes, the pigments and/or dyes in these layers may be different; the pigment and/or dye of the top layer of the first colored layer may provide desired color of the skin; the concentration of the added pigment and/or dye may be limited to facilitate transmission of visible light; to facilitate transmission of visible light, the pigment and/or dye may be provided as a fine-sized powder and/or as a liquid raw material; the pigments may be grinded to micron scale or nanometer scale and with a narrow particle size distribution and may be uniformly dispersed in a base material of the layer; the dyes may be dissolved in a solvent or polymeric resin; the pigment and/or dye added to the bottom layer of the second colored layer may shield the transmission of the visible light; concentration of the pigment and/or dye may be selected to provide low cost, ready availability and strong shielding for visible light; light transmittance of the top layer of the first colored layer may be greater than light transmittance of the peripheral region of the bottom layer of the second colored layer in the same thickness, and light transmittance of the peripheral region of the bottom layer of the second colored layer may approximate to zero; light transmittance may refer to an average transmittance of a visible light band having a wavelength range of 350 to 780 nm. (A test light source may be D65, and a method B spectrophotometry of GBT2410-2008 may be used for a test standard.)

According to an exemplary embodiment as indicated schematically in FIGS. 6A-6B, 7A-7B, 8A-8B, 9A-9B, 10A-10B, 13, 14A-14C, 15, 16, 17 and 18, light transmittance of the first colored layer and/or the second colored layer may be greater than or equal to light transmittance of the top layer of the first colored layer in the same thickness to facilitate transmission of light through the light-transmitting skin; the relatively high light transmittance of the reinforcing layer may be achieved by adding a small amount of or no pigment and dye into a material of this layer and using a light-colored or colorless transparent base material and additive; increasing the number of layers of the first colored layer and the number of layers of the second colored layer may add the working procedure and increase the working time and the cost, it may be advantageous to appropriately reduce the total number of layers of the first colored layer and the second colored layer in the case of meeting the above design purpose (the total number of layers of the first colored layer and the second colored layer may be preferably 2 to 5, and further preferably 3 to 4). The first colored layer may comprise the top layer and one reinforcing layer, and the second colored layer may comprise the bottom layer and one reinforcing layer.

According to an exemplary embodiment and indicated schematically in FIGS. 6A-6B, 7A-7B, 8A-8B, 9A-9B, 10A-10B, 13, 14A-14C, 15, 16, 17 and 18, the middle layer may be located between the first colored layer and the second colored layer and may optimize feeling when touched and may have (almost) no impact of displaying the color; the light transmittance of the middle layer may be greater than or equal to the light transmittance of the top layer of the first colored layer in the same thickness to provide desired light transmittance of the skin; the relatively high light transmittance of the middle layer may be achieved by adding a small amount of or no pigment and dye and using a light-colored or colorless transparent base material and additive; light transmittance of the middle layer and the reinforcing layer, which may be greater than light transmittance of the bottom layer of the second colored layer, may facilitate machining of a pattern region on the bottom layer of the second colored layer in addition to improvement of the visible light transmittance of the light-transmitting skin; since the reinforcing layer or the middle layer above the bottom layer of the second colored layer is in direct contact with the bottom layer of the second colored layer, when the pattern region is machined, or when the pattern region is thinned to the reinforcing layer or the middle layer, whether this thinning operation is completed may be easily determined according to different color.

According to an exemplary embodiment as indicated schematically in FIG. 11B, a laser may be used for thinning processing; the higher light transmittance of the reinforcing layer and the middle layer may make a laser relatively difficult to thin the reinforcing layer and the middle layer, so that the pattern region with an approximately uniformly equal thickness on all portions may be obtained on the bottom layer of the second colored layer by the laser; a pattern region and a peripheral region of the bottom layer of the second colored layer may have different thicknesses that may cause a difference in appearance or feel on a front surface of the light-transmitting skin; to minimize a difference in appearance or feel, thickness of the middle layer may be greater than or equal to thickness of the bottom layer of the second colored layer; thickness of the middle layer may be twice or more than twice the thickness of the bottom layer of the second colored layer. See e.g. also FIGS. 6A-6B, 7A-7B, 8A-8B, 9A-9B, 10A-10B, 13, 14A-14C, 15, 16, 17 and 18.

According to an exemplary embodiment, the first colored layer and/or the second colored layer may comprise at least one of (a) polyurethane, (b) polyvinyl chloride, (c) polystyrene, (d) polyolefin, (e) thermoplastic vulcanizate, (f) a polyester elastomer, (g) polyamide, (h) silicone. The polyurethane may comprise a thermosetting polyurethane or thermoplastic polyurethane. The polyvinyl chloride may comprise a semi-rigid polyvinyl chloride or soft polyvinyl chloride that may be obtained by mixing polyvinyl chloride with a plasticizer or may be a blend made of polyvinyl chloride mixing with rubber, such as Nitrile Butadiene Rubber (NBR). The polystyrene may comprise a block copolymer formed by polystyrene and polybutadiene, or polyisoprene, or ethylene-propylene rubber. The polyolefin may comprise a thermoplastic olefin (TPO) that may be obtained by mixing polypropylene or polyethylene with Ethylene-Propylene-Diene Monomer (EPDM) and may also comprise an elastomer formed by mixing polypropylene with a styrenic block copolymer (TPS). The polyester elastomer (TPE(-E)) may comprise a block copolymer that may be formed by a polyester hard segment and polyether or other polymer soft segments. Natural fibers may comprise animal, plant and mineral fibers, or chemical fibers may comprise artificial fibers, synthetic fibers, or inorganic fibers. The fibers may comprise at least one of plant fibers, artificial fibers, and synthetic fibers; the middle layer may be made of one of at least one of polyurethane, polyvinyl chloride, polystyrene, polyolefin, polyester elastomer, polyamide and silicone resin, and may comprise at least one of natural fibers and chemical fibers. The middle layer may comprise one or more layers. A material constituting a certain layer may be plastic, such as one or more of the aforementioned polyurethanes, polyvinyl chlorides, polystyrenes, polyolefins, polyester elastomer, polyamides and organic silicon resin, or fibers, such as the aforementioned fibers, but it may not be made by mixing the aforementioned plastic with the aforementioned fibers; preferably, there is a single middle layer having the thickness within 1.5 mm.

According to an exemplary embodiment as indicated schematically in FIGS. 19 and 20A-20D, a method for preparing the middle layer may comprise: preparing fluid with a high solid content from a resin and an additive (such as a solvent, a chain extender and an accelerator), and forming the middle layer through coating and curing; a method for preparing the middle layer may comprise forming the middle layer by using a monomer constituting a plastic and an additive (such as a solvent, a crosslinker, a curing agent and an accelerator) through coating and curing; a method for preparing the middle layer may comprise forming a middle layer thin sheet by performing various techniques such as extrusion molding, injection molding, flowing spread molding, blow molding and pressing spread molding, etc. and rolling on a thermoplastic plastic or a thermoplastic raw material that is not completely three-dimensionally crosslinked and cured. See also FIGS. 3A-3C, 4A-4B, 5A-5B, 6A-6B, 7A-7B, 8A-8B, 9A-9B, 10A-10B, 13, 14A-14C, 15, 16, 17 and 18.

According to an exemplary embodiment, to provide a resilient feeling when touched and desired light transmittance, the middle layer may comprise at least one hole; the hole may be observed when a cross section of the middle layer is optically magnified by 500 times or below; holes may be provided within the middle layer or may appear on the surface of the middle layer; the holes may be isolated or connected with one another; the holes may be made by chemical or physical foaming.

According to an exemplary embodiment, the middle layer may be prepared from at least one of (a) fibrous material; (b) a woven fabric; (c) a spacer fabric. The spacer fabric may comprise at least one of (a) a 3D mesh, (b) a 3D fabric, (c) a three-dimensional fabric, (d) a 3D spacer fabric, (e) a 3D mesh fabric, (f) a sandwich fabric, (g) an air layer fabric. The spacer fabric may comprise a significant thickness and may comprise spacer threads arranged in a generally vertical direction between the front and back layers of the fabric. The middle layer, due to its low density and gap form, may be conductive to transmission of visible light, and may impart a soft feeling when touched and resilience to the light-transmitting skin.

According to an exemplary embodiment indicated schematically in FIGS. 3A-3C, 4A-4B, 5A-5B, 6A-6B, 7A-7B, 8A-8B, 9A-9B, 10A-10B, 13, 14A-14C, 15, 16, 17 and 18, the light-transmitting skin may comprise mechanical strength to limit deformation when covering a component. A lining cloth may be provided on a back surface of the second colored layer; the lining cloth may comprise woven fabric or three-dimensional fabric comprising at least one of (a)

natural fibers, (b) chemical fibers, (c) plant fibers, (d) artificial fibers, (e) synthetic fibers. The woven fabric and the three-dimensional fabric may have better mechanical strength and visible light transmittance than a corresponding non-woven fabric and knitted fabric.

According to an exemplary embodiment, to provide light transmittance of the light-transmitting skin, fiber yarns of the middle layer and the lining cloth may be lightly-colored or without pigments/dyes. Yarns of the upper and lower surfaces of the spacer fabric and vertical wires may comprise monofilaments. The colored layers and the middle layer of the light-transmitting skin may be obtained by coating patterned release films with the first colored layer, the middle layer and the second colored layer. Hardening may be performed through thermal treatment and/or UV irradiation between multiple coatings. The hardening process may provide a physical change. For example, after materials such as an organic solvent and water in the raw materials are removed, only a solid material may be retained. The hardening process may provide a chemical change. For example, various ingredients including a curing agent, a crosslinker, a chain expander, an accelerator, etc. in the raw materials may turn from liquid into solid under specific conditions such as thermal treatment and/or UV, and small molecules may also be released. The fibrous middle layer may be bonded and compounded with the first colored layer and second colored layer obtained by coating and hardening. According to an exemplary embodiment, the multilayer light-transmitting skin may also be manufactured by other methods. See generally FIGS. 19 and 20A-20D. According to an exemplary embodiment, the multilayer skin may be obtained through multilayer extrusion or by injection molding, tape casting, blow molding and subsequent stretching or deep draw and/or followed by a lamination step where the bonding is achieved by thermal treatment and/or an adhesive (e.g. hot-melt glue). The colored layers and the middle layer may also comprise an additive from at least one of (a) a flame retardant, (b) an ultraviolet absorbent, (c) an anti-aging agent, (d) a filler, (e) a lubricating agent, (f) an antifriction agent, (g) a compatilizer, (h) a crosslinker, (i) a chain expander, (j) a curing agent, (k) a reaction accelerator, (l) a flowability improver and other additives. To improve light transmittance of the skin, in addition to the purposefully added pigments and/or dyes, all the materials should be preferably colorless or light-colored materials as much as possible; added solid additives may preferably comprise fine-sized powder in micron scale and below and with a narrow distribution width.

According to an exemplary embodiment as indicated schematically in FIGS. 11A-11C and 20A-20D, a method for preparing the light-transmitting skin may comprise machining the pattern region set on the second colored layer through laser engraving, chemical etching, plasma/ion/electron beam thinning and the like to obtain the light-transmitting skin with the pattern region.

According to an exemplary embodiment as indicated schematically in FIGS. 4A-4B, 5A-5B, 6A-6B, 7A-7B, 8A-8B, 9A-9B, 10A-10B, 13, 14A-14C, 15, 16, 17 and 18, a light-transmitting trim comprising the light-transmitting skin may comprise a substrate and a light source. According to an exemplary embodiment, a light-transmitting trim may comprise at least one of (a) a buffer layer, (b) a sensor and/or other components (e.g. functional layer).

According to an exemplary embodiment as indicated schematically in FIGS. 4A-4B, 5A-5B, 6A-6B, 7A-7B, 8A-8B, 9A-9B, 10A-10B, 13, 14A-14C, 15, 16, 17 and 18, a light-transmitting trim C/100 with display D may be applied to an automotive interior, such as a door panel, a dashboard, a seat and an armrest between a driver and a front passenger. See also FIGS. 1B, 2 and 12. As indicated schematically, when the light-transmitting trim C/100 with display D is illuminated by a light source in the light-transmitting trim C/100 with display D, the visible surface of the light-transmitting trim C/100 with display D may display a specific pattern, so as to achieve decorating and lighting effects. The light-transmitting trim C/100 with display D is not limited to be used in the automotive interior and may also be applied to other fields. See FIGS. 3A-3C, 4A-4B, 5A-5B, 6A-6B, 7A-7B, 8A-8B, 9A-9B, 10A-10B, 13, 14A-14C, 15, 16, 17 and 18, As shown schematically in FIG. 13, the light-transmitting trim C/100 with display D may comprise a light-transmitting skin 30/T, a substrate 20 and a light source 10; a buffer layer 40 for further improving the buffer and resilience performance may further be added between the light-transmitting skin T/30 and the substrate 20; the buffer layer 40 may comprise one or several of a fabric, a non-woven fabric and foam. See FIGS. 6A-6B, 7A-7B, 8A-8B, 9A-9B, 10A-10B, 13, 14A-14C, 15, 16, 17 and 18.

According to an exemplary embodiment as shown schematically in FIG. 14A, the light-transmitting skin T/30 may comprise a first colored layer 301/T1, a middle layer 302/T2 and a second colored layer 303a/T3; the second colored layer 303a/T3 may comprise a bottom layer 303/T3; the bottom layer 303a may comprise a peripheral region 3031 and a pattern region 3032. According to an exemplary embodiment as shown schematically in FIG. 14B, the first colored layer 301/T1 of the light-transmitting skin 30 may comprise two layers (i.e., a top layer 301a/T1a and a reinforcing layer 301b/T1b below the top layer 301a/T1a). According to an exemplary embodiment as shown schematically in FIG. 14C, the second colored layer 303/T3 of the light-transmitting skin 30 may comprise two layers (i.e., a bottom layer 303a and a reinforcing layer 303b above the bottom layer 303a). As shown schematically in FIG. 14A to FIG. 14C, the second colored layer 303 may comprise the peripheral region 3031 and the pattern region 3032, and the peripheral region 3031 may surround the pattern region 3032. See also FIGS. 11A-11C. As indicated schematically, the first colored layer 301/T1 in FIG. 14A, the top layer 301a/T1a of the first colored layer 301/T1 in FIG. 14B and the bottom layer 303a of the second colored layer 303/T3 in FIG. 14C may comprise a pigment and/or dye in an appearance color of the light-transmitting skin T/30 that may be observed by a driver or passenger. As indicated schematically in FIG. 15, visible light may be allowed to pass through by controlling the concentration of the added pigment and/or dye. As indicated schematically, the middle layer 302/T2 in FIG. 14A, the reinforcing layer 301b/T1b of the first colored layer 301/T1 and the middle layer 302/T2 in FIG. 14B, and the middle layer 302/T2 and the reinforcing layer 303b of the second colored layer 303/T3 in FIG. 14C may comprise no pigment and/or dye, so as to improve light transmittance of the light-transmitting skin T/30 to the visible light. See also FIGS. 3A-3C, 4A-4B, 5A-5B, 6A-6B, 7A-7B, 8A-8B, 9A-9B, 10A-10B, 13, 14A-14C, 15, 16, 17 and 18.

Figure 15:
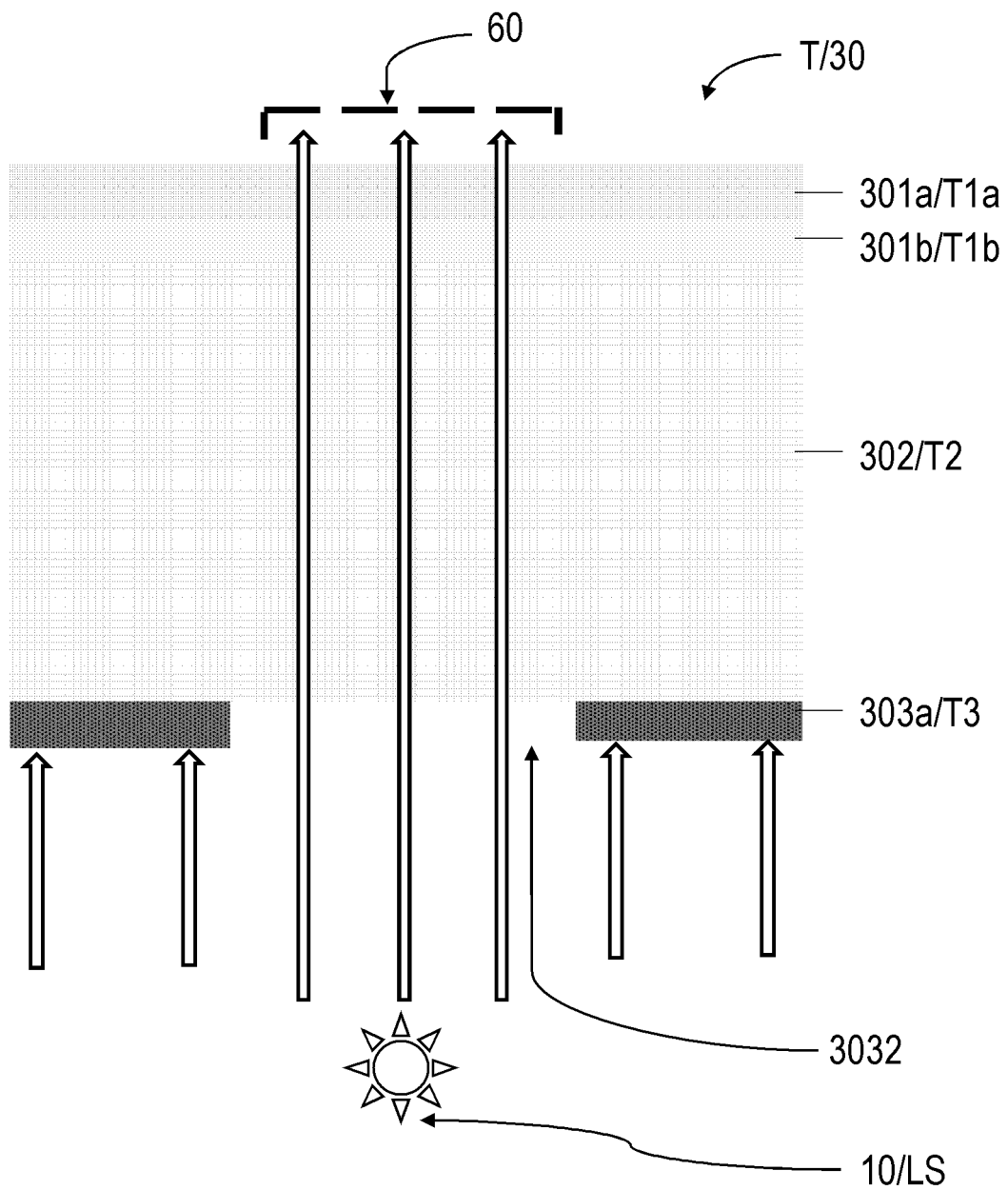
FIG. 15 is a schematic partial section view of a vehicle interior component according to an exemplary embodiment.
Figure 16:
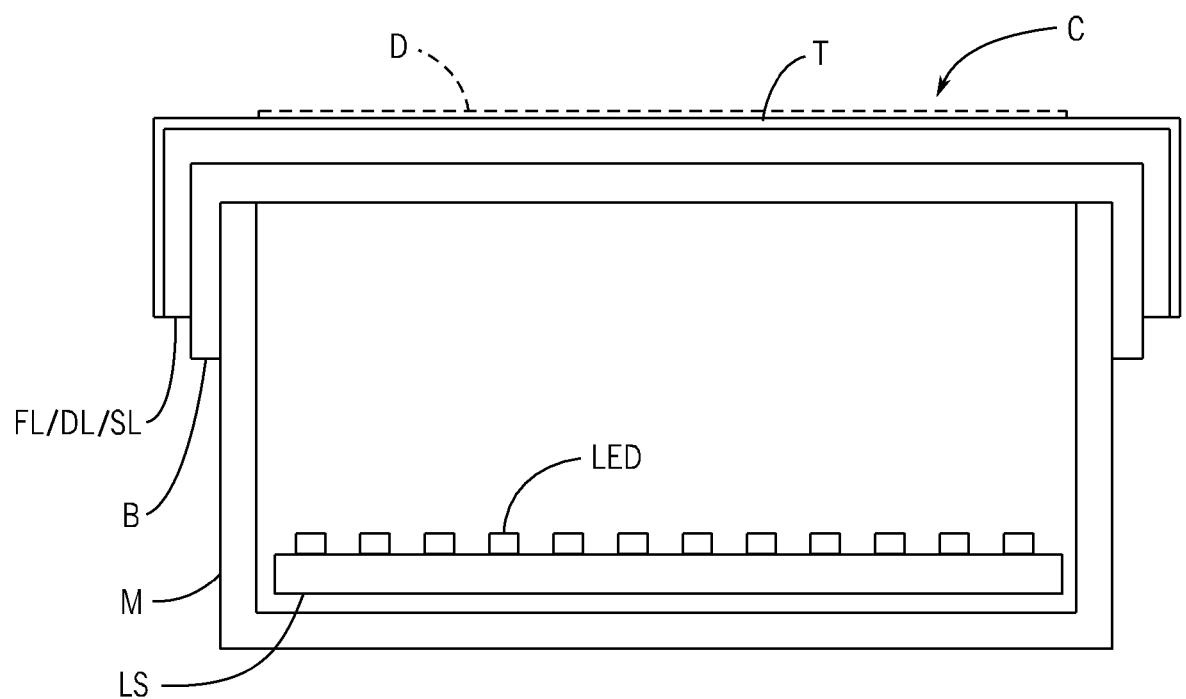
FIG. 16 is a schematic section view of a vehicle interior component according to an exemplary embodiment.
Figure 17:
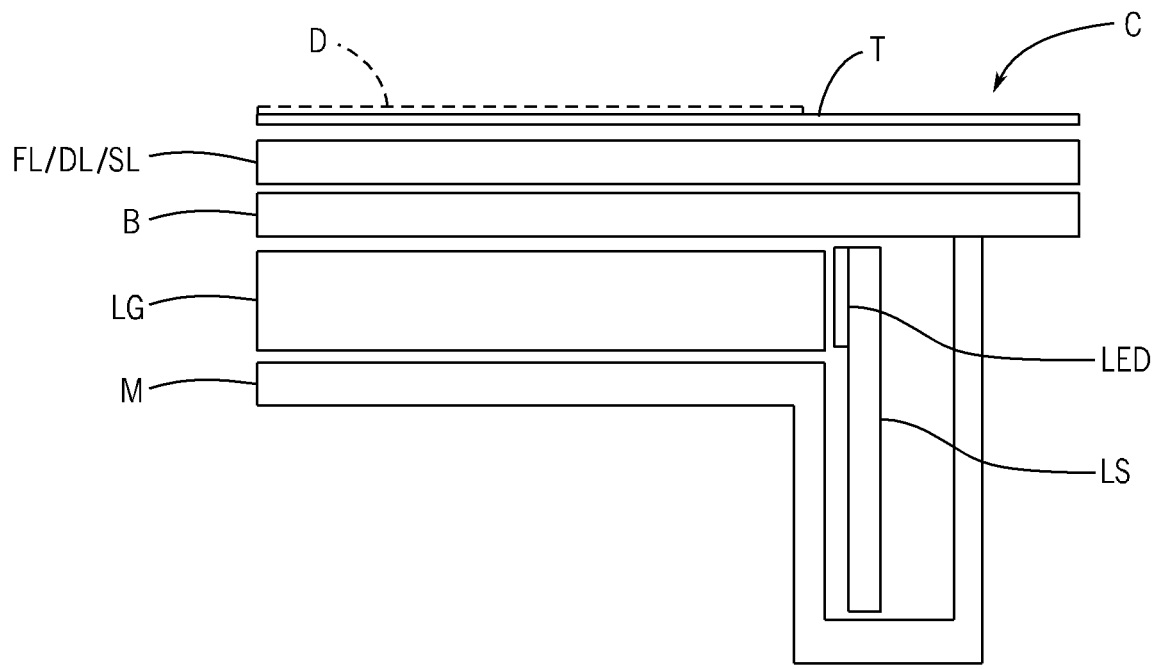
FIG. 17 is a schematic partial section view of a vehicle interior component according to an exemplary embodiment.
Figure 18:
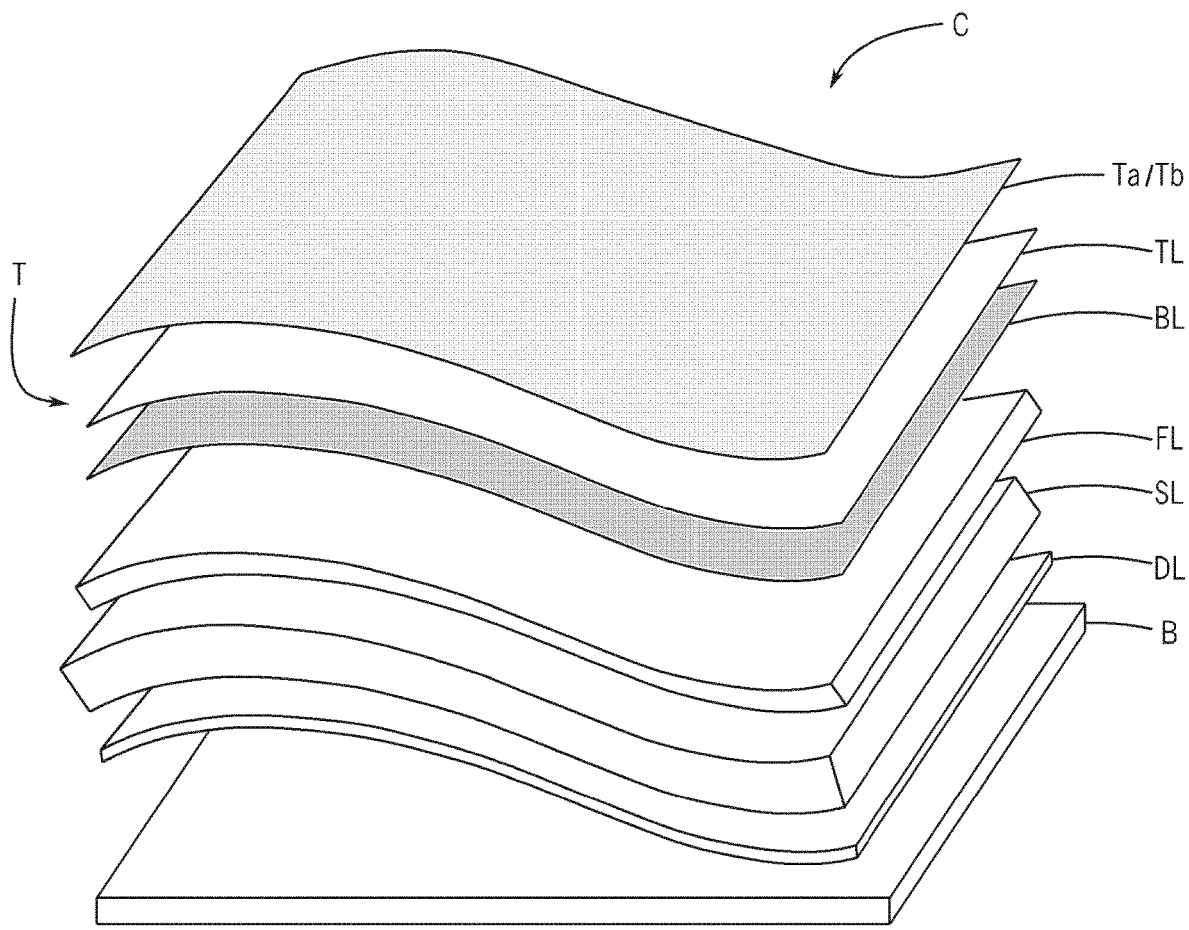
FIG. 18 is a schematic exploded perspective view of a vehicle interior component according to an exemplary embodiment.

As shown schematically in FIG. 15, when the light source 10/LS shown as comprising an LED/array emits the visible light, the light may only pass through the pattern region 3032 of the second colored layer 303/T3, and then sequentially passes through the middle layer 302/T2 and the first colored layer 301/T1 (including 301b/T1b and 301a/T1a), so that the light 60 passing by forms a set pattern on the outer surface of the first colored layer 301/T1. See also FIGS. 16 and 17.

According to an exemplary embodiment indicated schematically in FIGS. 3A-3C, 4A-4B, 5A-5B, 6A-6B, 7A-7B, 8A-8B, 9A-9B, 10A-10B, 13, 14A-14C, 15, 16, 17 and 18, a light-transmitting skin may comprise a first colored layer comprising a top layer, and a second colored layer comprising a bottom layer; the bottom layer of the second colored layer may comprise at least one pattern region and a peripheral region surrounding the pattern region; and the peripheral region surrounding the pattern region may be lightproof (e.g. light blocking); the light-transmitting skin may comprise a middle layer located between the first colored layer and the second colored layer; the first colored layer may comprise at least one reinforcing layer located between the top layer and the middle layer, and/or, the second colored layer may comprise at least one reinforcing layer located between the bottom layer and the middle layer; for each layer in a same thickness, the light transmittance of the middle layer and the reinforcing layer may be greater than or equal to the light transmittance of the top layer of the first colored layer, and the light transmittance of the top layer of the first colored layer may be greater than the light transmittance of the peripheral region of the bottom layer of the second colored layer; the thickness of the middle layer may be greater than or equal to the thickness of the bottom layer of the second colored layer; the thickness of the middle layer may be twice or more than twice the thickness of the bottom layer of the second colored layer; the first colored layer and the second colored layer may comprise plastic materials, and may comprise at least one of polyurethanes, polyvinyl chlorides, polystyrenes, polyolefins, a polyester elastomer, polyamides and silicones; the middle layer may comprise a plastic material, and may comprise at least one of polyurethanes, polyvinyl chlorides, polystyrenes, polyolefins, a polyester elastomer, polyamides and silicones, or the middle layer may comprise a woven fabric or a three-dimensional fabric made of natural fibers and/or chemical fibers; when the middle layer is a plastic material, lining cloth may be provided on the back surface of the second colored layer, and the lining cloth may comprise a woven fabric or a three-dimensional fabric; the thickness of the pattern region may be less than the thickness of the peripheral region; the pattern region of the second colored layer may be treated by drilling, sanding, laser engraving, chemical etching and/or ion/electron beam thinning; a light-transmitting trim may comprise the light-transmitting skin, a substrate, and a light source.

According to an exemplary embodiment indicated schematically in FIGS. 3A-3C, 4A-4B, 5A-5B, 6A-6B, 7A-7B, 8A-8B, 9A-9B, 10A-10B, 13, 14A-14C, 15, 16, 17 and 18, the component may comprise a light-transmitting skin and a light-transmitting trim with the light-transmitting skin; the light-transmitting skin may comprise a first colored layer comprising a top layer, and a second colored layer comprising a bottom layer; the bottom layer of the second colored layer may comprise at least one pattern region and a peripheral region surrounding the pattern region; the peripheral region surrounding the pattern region may be lightproof; the light-transmitting trim may comprise the light-transmitting skin, a substrate and a light source; when the light-transmitting skin and the light-transmitting trim are applied to an automotive interior, the grade and the decorating effect of the interior and the driving experience may be improved.

Figure 19:
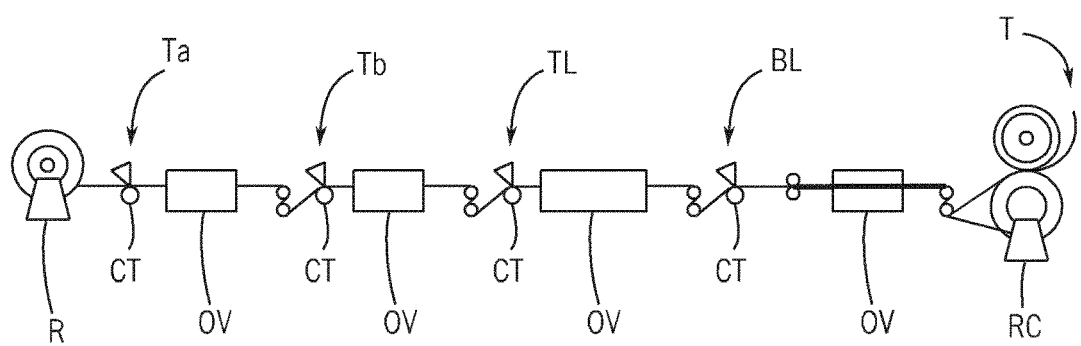
FIG. 19 is a schematic diagram of a method of forming a vehicle interior component according to an exemplary embodiment.
Figure 20A:
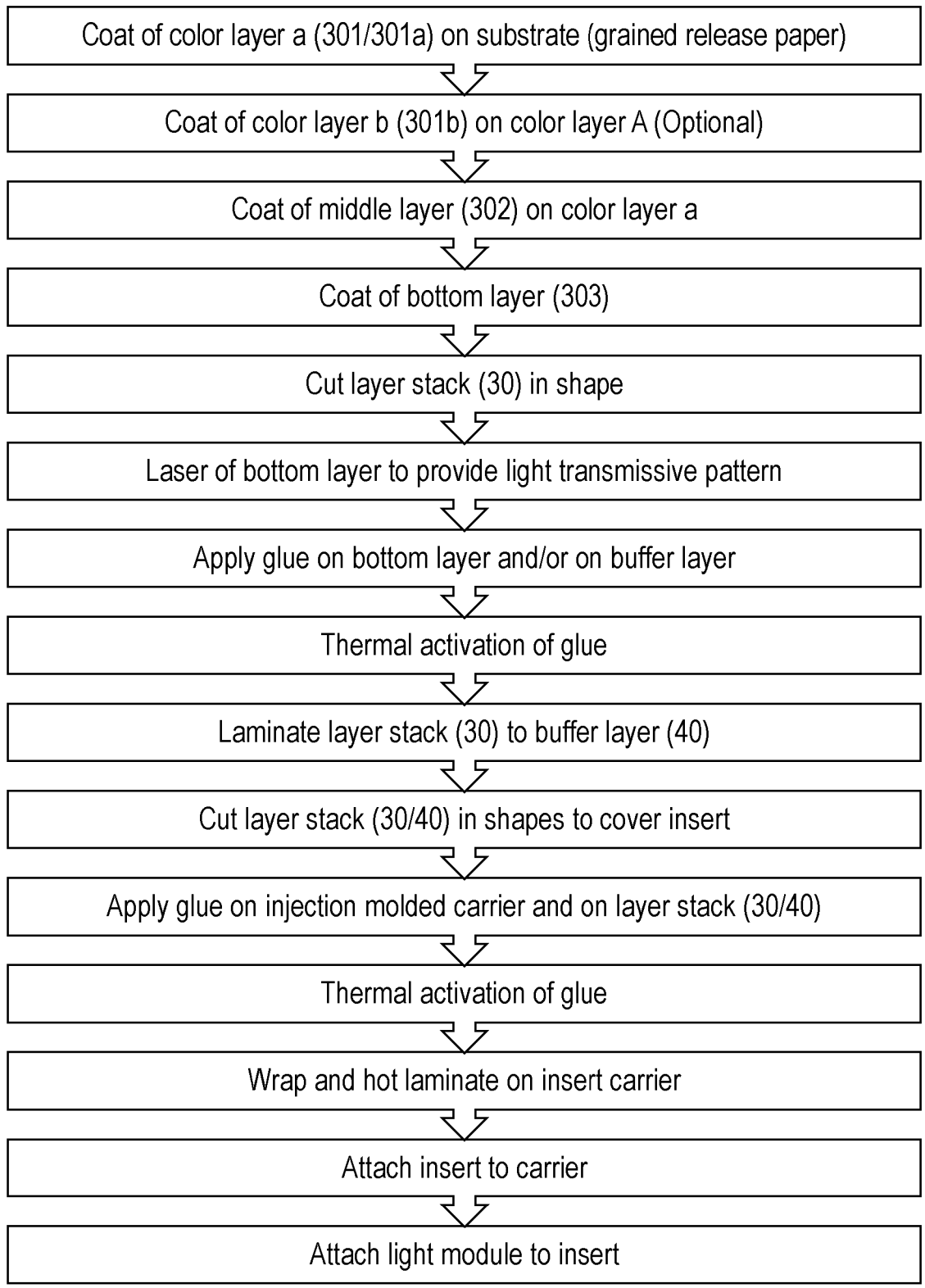
FIGS. 20A through 20D are schematic flow diagrams of methods for forming a vehicle interior component according to an exemplary embodiment.
Figure 20B:
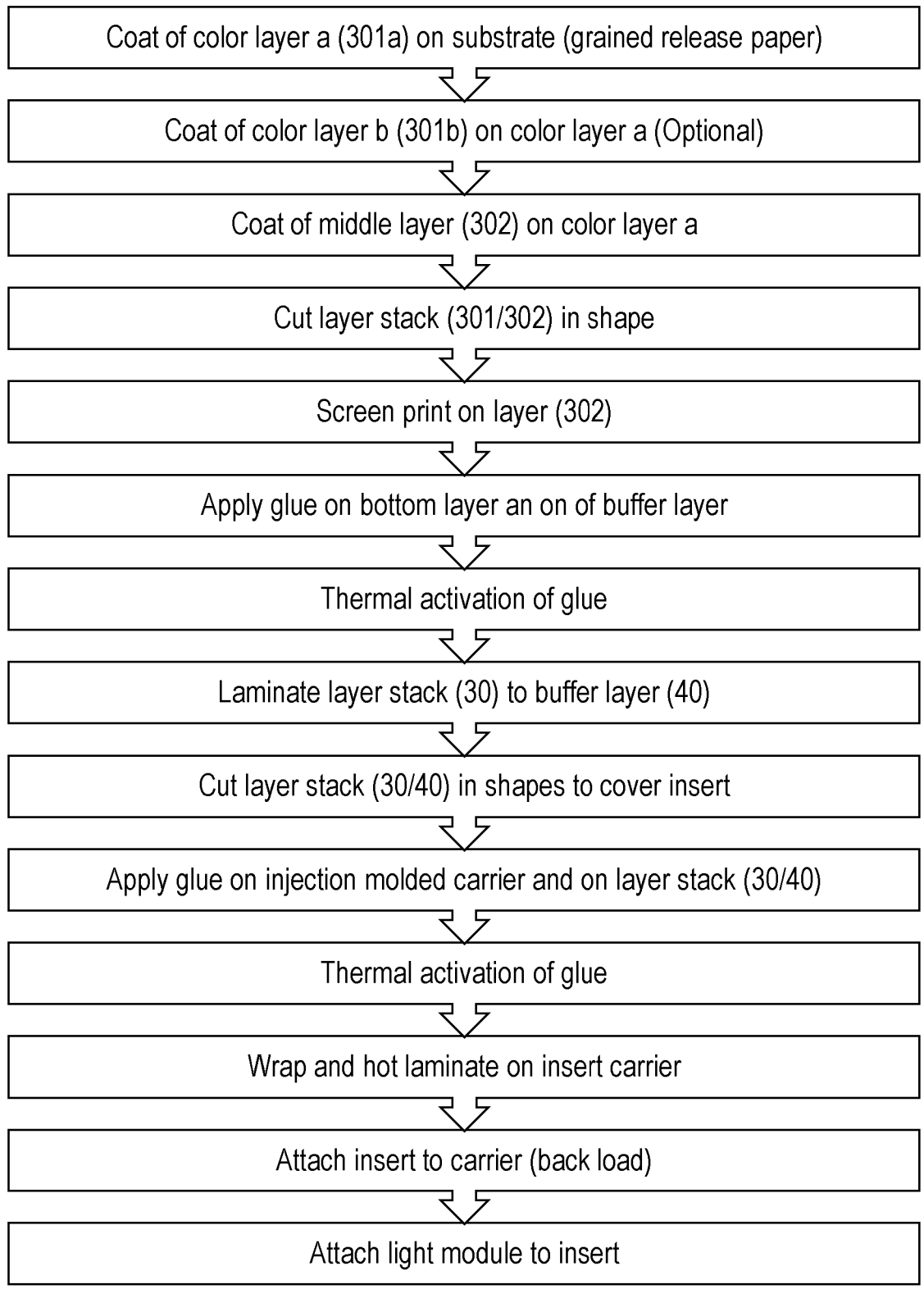
Figure 20C:
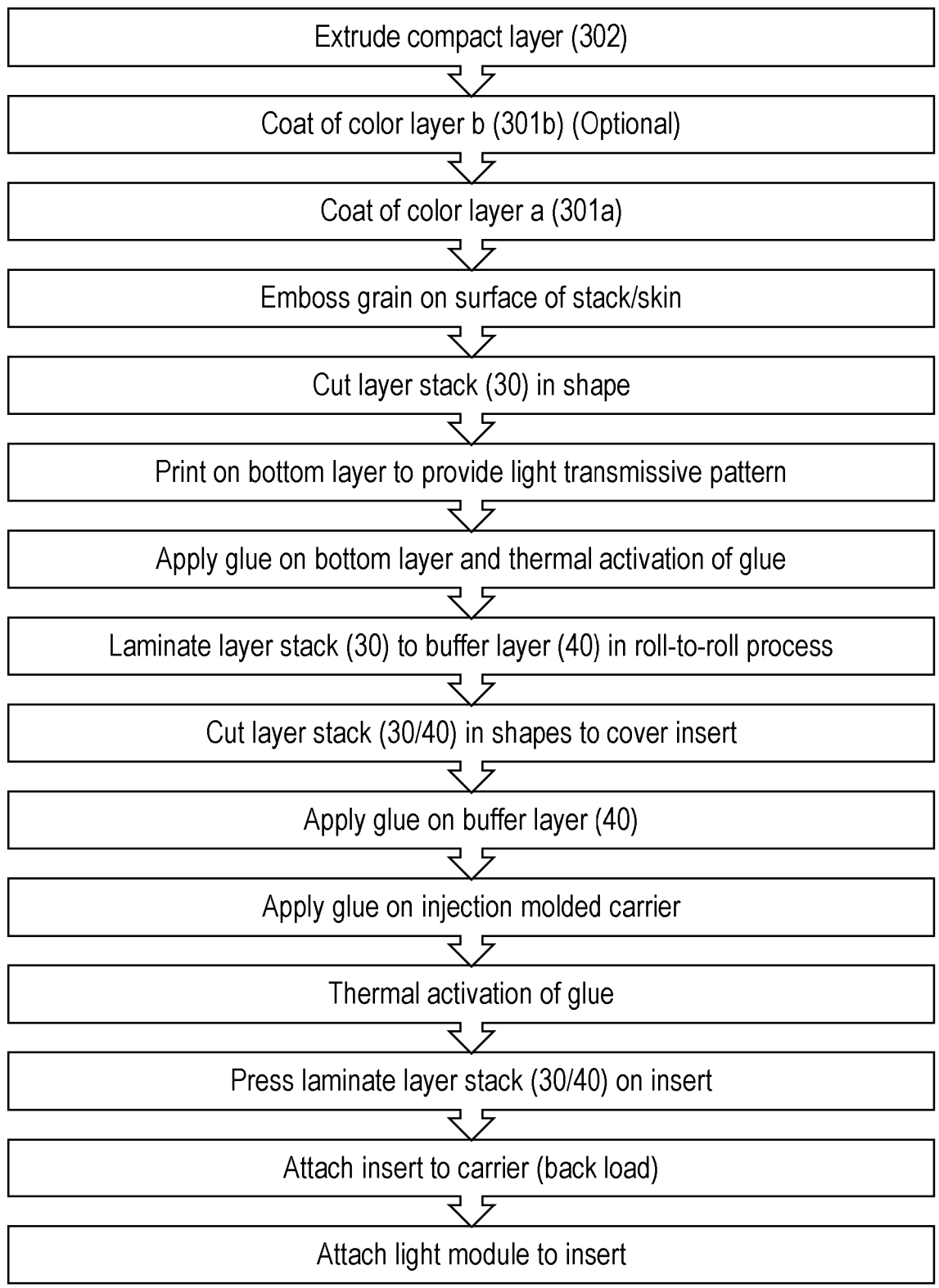
Figure 20D:
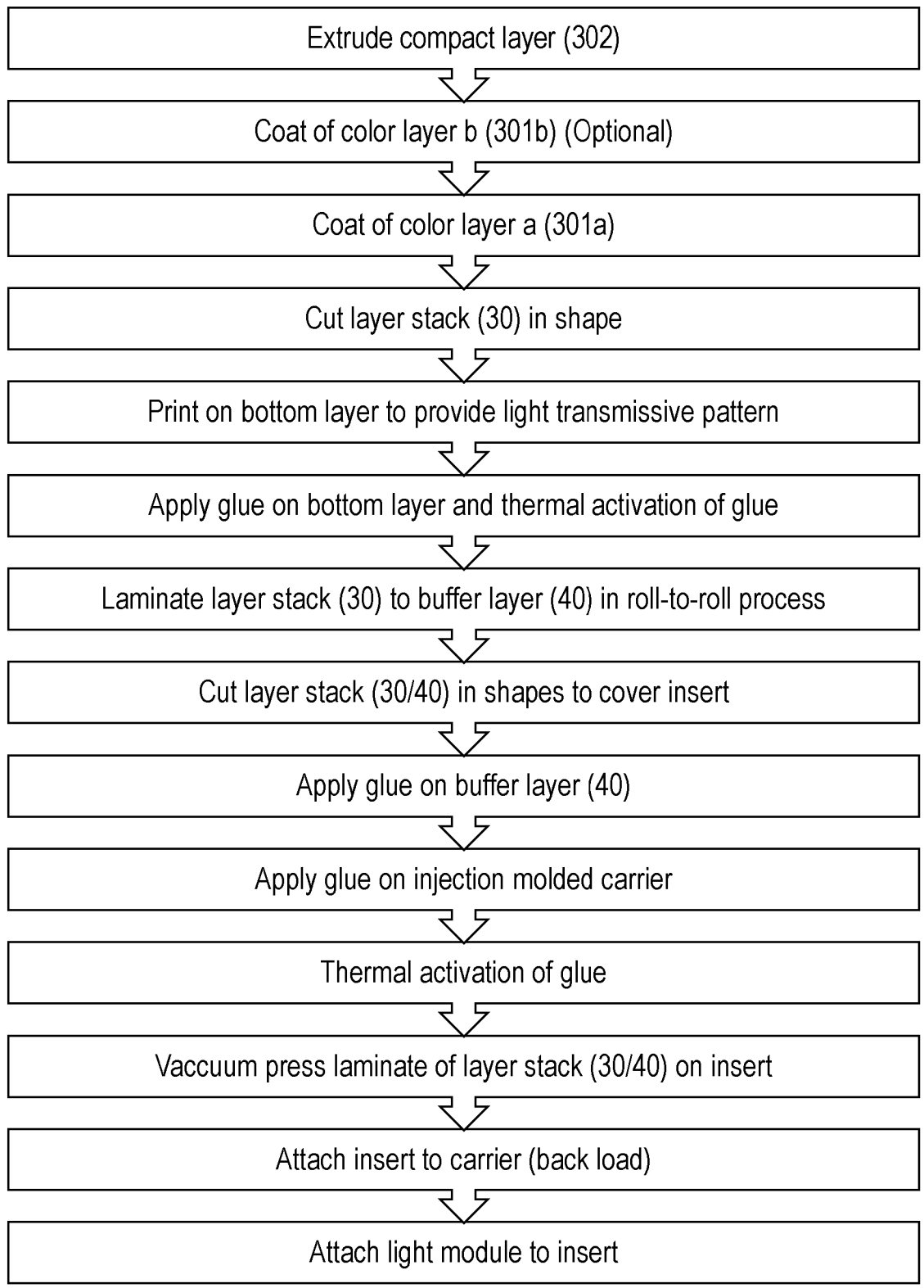

According to an exemplary embodiment, a process for manufacture/production of the component may comprise the steps indicated in FIGS. 19 and 20A-20 (e.g. roller R, coating CT, oven OV, roller/recycle roll RC, composite layer T).

Exemplary Embodiments—B

As indicated schematically according to an exemplary embodiment in FIGS. 3A-3C, 4A-4B, 5A-5B, 6A-6B, 7A-7B, 8A-8B, 9A-9B, 10A-10B, 13, 14A-14C, 15, 16, 17 and 18, a vehicle interior component configured to provide a display such as of an image from illumination by a light source may comprise a composite structure comprising a cover providing a cover surface and a substrate; the cover may comprise a cover layer and a bottom layer; the composite structure may be configured so that the display of the image is presented on the cover surface; so that illumination from the light source will provide display of the image at the cover surface. The cover surface may comprise a skin. The cover may comprise an intermediate layer. The intermediate layer may comprise a light-transmissive layer. The cover layer may comprise a surface layer. The cover layer may comprise a surface layer and a base layer. The base layer may comprise a reinforcing layer. The bottom layer may comprise a reinforcing layer. The surface layer may comprise a pigment. The cover layer may comprise a pigment. The base layer may comprise a pigment. The surface layer may comprise a colorant (or pigment, dye, etc.). The cover layer may comprise a colorant (or pigment, dye, etc.). The bottom layer may comprise a reinforcing layer. The bottom layer may comprise a light-blocking layer. The bottom layer may comprise a colorant (or pigment, dye, etc.). The bottom layer may comprise a peripheral region and a pattern region. The pattern region may comprise the image. The bottom layer may comprise a mask. The bottom layer may comprise a mask configured to provide a pattern. The pattern may comprise the image. The composite structure may comprise a functional layer. The functional layer may comprise a sensor grid. The functional layer may comprise a capacitive sensor. The functional layer may comprise a textile. The cover surface may comprise a skin. The textile may comprise reinforcement for the skin. The composite structure may comprise a spacer layer. The spacer layer may comprise a buffer layer. The spacer layer may comprise a space. The spacer layer may comprise a fabric. The spacer layer may comprise at least one of (a) a fabric; (b) a mesh fabric; (c) a non-woven sheet; (d) a woven sheet; (e) a foam layer; (f) a separator; (g) a material having light transmissibility; (h) a polyester material; (i) a mono-filament material; (j) a multi-filament material. Light transmissibility for the material of the spacer layer may be in a range of between approximately 30 percent and approximately 90 percent. The component further comprising a module. The module may comprise a housing. The module may comprise the composite structure. The module may comprise the light source. The module may comprise a housing. The composite structure may comprise a diffuser layer. The diffuser layer may comprise a diffuser sheet. The diffuser layer may comprise a lens. The diffuser layer may comprise a material with light transmissibility. Light transmissibility may be in a range of between approximately 40 percent and approximately 90 percent. The composite structure may comprise the cover and a functional layer and the substrate. The composite structure may comprise the cover and a spacer layer and a functional layer and a base; the base may comprise the substrate. The composite structure may comprise the cover and a functional layer and the base. The composite structure may comprise the cover and a functional layer and the base. The composite structure may comprise the cover and a functional layer and the base. The composite structure may comprise the cover and a diffuser layer and the base. The substrate may comprise a base. Light transmissibility of the substrate may be in a range of between approximately 80 percent and approximately 95 percent. Light transmissibility of the cover may be in a range of between approximately 3 percent and approximately 10 percent.

According to an exemplary embodiment, the component providing the display D may comprise the light source (e.g. light source LS in a module M); the light source may comprise an LED array (to transmit illumination/light from LED/LED array to the surface layer for display D); the light source may comprise an LED; the light source may comprise an LED and a light guide; the LED may comprise and/or be configured to operate as a sidelight for the light guide (to transmit illumination/light from light guide to the surface layer for display D). See FIGS. 16 and 17. Without illumination from the light source the image is not visible at the cover surface. Compare FIG. 4A (image not visible on cover) and 4B (image visible at display on surface layer of cover) and also FIGS. 5A (image not visible) and 5B (image visible at display on surface layer of cover).

TABLE B

REFERENCE SYMBOL LIST

| ELEMENT, PART OR COMPONENT | REFERENCE SYMBOL |
|---|---|
| Vehicle | V |
| Interior | I |
| Component | C/100 |
| Instrument panel | IP |
| Floor console | FC |
| Door panel | DP |
| Arm rest | AR |
| Display/display region (of component/composite structure) | D |
| Image | IM |
| Base or substrate | B/20 |
| Spacer layer (buffer layer) | SL/40 |
| Functional layer | FL |
| Diffuser layer | DL |
| module/assembly (of component) | M |
| Cover | T/30 |
| top layer (composite layer) | 301 |
| top layer | T1a/Ta/301a |
| reinforcing layer | T1b/Tb/301b |
| intermediate/middle layer (pigmented layer) | T2/TL/302 |
| substrate layer (bottom/reinforcing and/or pigmented layer) | T3/BL/303 |
| bottom layer | 303a |
| reinforcing layer | 303b |
| peripheral region | 3031 |
| pattern region | 3032 |
| Light source | LS/10 |
| Light output | 60 |
| LED | LED |
| light guide | LG |
| Material deposition apparatus/Ink jet | IJ |
| Laser/etch apparatus | LR |
| Mask | MK |
| roller | R |
| coating | CT |
| oven | OV |
| roller/recycle | RC |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component configured to provide a display of an image from illumination by a light source comprising:
    a composite structure comprising a substrate and a cover;
    wherein the cover comprises a bottom layer and an intermediate layer and a cover layer;
    wherein the intermediate layer of the cover is between the bottom layer of the cover and the cover layer of the cover;
    wherein the intermediate layer of the cover comprises a light-transmissive sheet between the cover layer of the cover and the bottom layer of the cover;
    wherein the cover layer of the cover comprises a light-transmissive skin providing a cover surface;

wherein the bottom layer of the cover comprises a peripheral region and a pattern region below the cover layer of the cover;
wherein the pattern region of the bottom layer of the cover comprises the image to be presented by illumination;
wherein the composite structure is configured so that the display of the image is presented at the cover surface;
so that illumination from the light source through the composite structure will display the image at the cover surface.

2. The component of claim 1 wherein the bottom layer of the cover comprises a sheet and the cover layer of the cover comprises a sheet.

3. The component of claim 1 wherein the intermediate layer of the cover comprises a reinforcing layer for the cover between the top layer of the cover and the bottom layer of the cover.

4. The component of claim 1 wherein the light-transmissive sheet of the intermediate layer of the cover comprises a colorless base material between the top layer of the cover and the bottom layer of the cover.

5. The component of claim 1 wherein the cover layer of the cover comprises a base layer.

6. The component of claim 5 wherein the base layer of the cover layer comprises a reinforcing layer.

7. The component of claim 1 wherein the cover layer of the cover comprises a colorant.

8. The component of claim 1 wherein the bottom layer of the cover comprises a light-blocking layer.

9. The component of claim 1 wherein the composite structure comprises a functional layer between the cover and the substrate; wherein the functional layer comprises at least one of a spacer layer; a diffuser layer; a sensor grid; a capacitive sensor; a textile; a textile configured to provide reinforcement for the skin; a material configured to impart resilience and a soft feeling when touched.

10. The component of claim 1 wherein the composite structure comprises a spacer layer between the cover and the substrate; wherein the spacer layer comprises at least one of (a) a spacer; (b) a fabric; (c) a mesh fabric; (d) a non-woven sheet; (e) a woven sheet; (f) a foam layer; (g) a separator; (h) a material having light transmissibility; (i) a polyester material; (j) a mono-filament material; (k) a multi-filament material; (l) a buffer layer; (m) a diffuser.

11. The component of claim 1 wherein the composite structure comprises a diffuser layer between the cover and the substrate; wherein the diffuser layer comprises at least one of a diffuser sheet; a lens; a material with light transmissibility.

12. The component of claim 1 wherein the composite structure comprises a spacer layer between the cover and the substrate and a functional layer between the cover and the substrate.

13. The component of claim 1 wherein the light source is configured to provided illumination for the image presented at the cover surface of the cover and comprises at least one of an LED array; an LED; an LED and a light guide; a sidelight and a light guide.

14. A component for a vehicle interior comprising:
(a) a substrate;
(b) a cover on the substrate;
wherein the cover comprises a top layer comprising a first color layer and a bottom layer comprising a second color layer;
wherein the bottom layer of the cover comprises at least one pattern region and a peripheral region surrounding the pattern region;
wherein the pattern region of the bottom layer of the cover is light-transmissive and the peripheral region of the bottom layer of the cover surrounding the pattern region is light blocking.

15. The component of claim 14 wherein the cover further comprises an intermediate layer located between the top layer of the cover and the bottom layer of the cover.

16. The component of claim 15 wherein the first color layer comprises a reinforcing layer above the intermediate layer.

17. The component of claim 15 wherein the intermediate layer of the cover comprises a thickness; wherein the bottom layer of the cover comprises a thickness; wherein the thickness of the intermediate layer of the cover is greater than or equal to the thickness of the bottom layer of the cover.

18. The component of claim 15 wherein the first color layer of the cover comprises a plastic material; wherein the second color layer of the cover comprises a plastic material; wherein the plastic material of the first color layer of the cover comprises at least one of (a) polyurethanes or (b) polyvinyl chlorides or (c) polystyrenes or (d) polyolefins or (e) a polyester elastomer or (f) polyamides and silicone; wherein the intermediate layer of the cover comprises a plastic material comprising at least one of (a) polyurethanes or (b) polyvinyl chlorides or (c) polystyrenes or (d) polyolefins or (e) a polyester elastomer or (f) polyamides or (g) silicone.

19. The component of claim 14 wherein the bottom layer of the cover comprises a light-transmissive skin; wherein the light-transmissive skin comprises a soft thin plastic sheet.

\* \* \* \* \*